US012548994B2

(12) United States Patent
Reid et al.

(10) Patent No.: US 12,548,994 B2
(45) Date of Patent: Feb. 10, 2026

(54) GROUND FAULT INTERRUPTING SYSTEM FOR HVAC EQUIPMENT

(71) Applicant: Schneider Electric USA, Inc., Andover, MA (US)

(72) Inventors: Paul A. Reid, Cedar Rapids, IA (US); Brett E. Larson, Cedar Rapids, IA (US)

(73) Assignee: Schneider Electric USA, Inc., Boston, MA (US)

( * ) Notice: Subject to any disclaimer, the term of this patent is extended or adjusted under 35 U.S.C. 154(b) by 193 days.

(21) Appl. No.: 18/375,347

(22) Filed: Sep. 29, 2023

(65) Prior Publication Data

US 2025/0112451 A1 Apr. 3, 2025

(51) Int. Cl.
*H02H 3/16* (2006.01)
*G01R 31/327* (2006.01)
*G01R 31/52* (2020.01)

(52) U.S. Cl.
CPC ......... *H02H 3/167* (2013.01); *G01R 31/3277* (2013.01); *G01R 31/52* (2020.01)

(58) Field of Classification Search
CPC ..... H02H 3/167; G01R 31/52; G01R 31/3277
See application file for complete search history.

(56) References Cited

U.S. PATENT DOCUMENTS

| 5,793,587 | A | 8/1998 | Boteler |
| 2007/0208520 | A1 | 9/2007 | Zhang et al. |
| 2008/0212244 | A1 | 9/2008 | Bilac |
| 2014/0211345 | A1* | 7/2014 | Thompson ............. B60L 53/68 335/11 |

FOREIGN PATENT DOCUMENTS

| CN | 2938688 Y | 8/2007 |
| EP | 0866535 A2 | 9/1998 |

OTHER PUBLICATIONS

Extended European Search Report and Written Opinion dated Feb. 24, 2025 for corresponding European Application No. EP 24198002.8, 9 pages.

\* cited by examiner

*Primary Examiner* — Scott Bauer
(74) *Attorney, Agent, or Firm* — Wolf, Greenfield & Sacks, P.C.

(57) ABSTRACT

A device and method are provided for interrupting power to a branch circuit and connected load. The device includes a first ground fault (GF) sensor for monitoring a first leakage current across line conductor(s) and grounding conductor of the branch, which ignores leakage current across the grounding conductor, and a second GF sensor for monitoring a second leakage current of the load from the line conductor(s), which takes into account leakage current across the grounding conductor. A processor(s) detects for a GF on the branch circuit based on the first leakage current monitored by the first GF sensor; detects for a GF at the load due to excessive leakage current based on the second leakage current and an allowable/acceptable amount of leakage current for the load; and controls an interruption of power to the branch circuit if the GF on the branch circuit or at the load is detected.

23 Claims, 16 Drawing Sheets

TABLE

1400

Ground Fault Interrupting Device Protection Matrix for HVAC and Other Equipment

| Scenario | Detection level | | | | Ground Monitor | Appliance Allowed Leakage | Notes |
|---|---|---|---|---|---|---|---|
| | L1-GC | L2-GC | L1-E | L2-E | | Appliance Metallic Frame-E | |
| Ref. UL943 GFCI | 6 mA | 6 mA | 6 mA | 6 mA | No | 4 mA | |
| 1st Embod. - 10/100 | 20 mA | 20 mA | 5 mA | 5 mA | Yes | 15 mA | |
| 2nd Embod. - 10A /100A | 20 mA | 20 mA | 20 mA | 20 mA | Yes | 15 mA | |
| 3rd Embod. - 10B /100B | None | None | 5 mA | 5 mA | Yes | Handle Rating | |
| 4th Embod. - 10C /100C | None | None | 5 mA | 5 mA | No | Handle Rating | |
| 5th Embod. - 10D /100D | 20 mA | 20 mA | 5 mA | 5 mA | Yes | 15 mA | Same as 1st Embod. 10/100 |
| 6th Embod. - 10E/100E | 20 mA | 20 mA | 5 mA | 5 mA | No | 15 mA | |

GC = Grounding Conductor
E = Earth Ground
L1 = Ungrounded Conductor Line 1
L2 = Ungrounded Conductor Line 2

Notes:
1) The appliance metallic frame to earth allowable leakage current to earth would normally equal L1/L2 to allowable leakage current to earth without the ground monitor. With the ground monitor the leakage current from the metallic frame to earth is close to zero since the ground monitor makes sure the impedance from the frame to earth is very low due to monitoring the grounding conductors and making sure the ground conductor impedance is low.

FIG. 14

GROUND FAULT INTERRUPTING SYSTEM FOR HVAC EQUIPMENT

FIELD

This disclosure relates generally to ground fault detection and protection, and more particularly, to systems and methods of providing ground fault detection and protection for Heating, Ventilation, and Air Conditioning (HVAC) equipment and other equipment which have significant allowable/acceptable leakage current under normal operation.

BACKGROUND

Modern HVAC equipment may utilize variable speed drives and electronically controlled motors to achieve the highest possible efficiency. The drawback of these systems is increased electrical noise produced by high frequency switching. Filtering equipment added to mitigate the switching noise can increase the current flowing through the grounding conductor that includes a combination of line frequency and high frequency current. The current returning through the grounding conductor is detected by a GFCI circuit breaker as a ground fault that may result in tripping of the GFCI protection. Due to the normal leakage current associated with this type of equipment, the standards for such equipment allow leakage current above that at which the GFCI must trip. As a result, modern HVAC equipment is not inherently compatible with Class A GFCI protection.

There is a need for a new and improved system-based approach to ground fault detection and protection that allows for an appropriate level of grounding conductor leakage current from the HVAC equipment or other similar types of equipment while providing protection for "let-go" or other physiological condition(s) for the branch circuit conductors feeding the equipment.

SUMMARY

In accordance with an embodiment, a device is provided for interrupting a supply of power to a branch circuit that supplies power to a load. The circuit includes at least a line conductor(s) and a grounding conductor different from the line conductor(s). The device includes a first ground fault sensor for monitoring an amount of a first leakage current across the line conductor(s) and the grounding conductor, the amount of the first leakage current ignoring leakage current across the grounding conductor; and a second ground fault sensor for monitoring an amount of a second leakage current of the load from the line conductor(s), the amount of the second leakage current taking into account leakage current across the grounding conductor. The device also includes a processor(s) configured to: detect for a ground fault on the branch circuit based on the amount of the first leakage current monitored by the first ground fault sensor; detect for a ground fault at the load due to excessive leakage current based on the amount of the second leakage current and an allowable/acceptable amount of leakage current for the load under normal operation; and to control an interruption of the supply of power to the branch circuit if the ground fault on the branch circuit or at the load is detected.

In various embodiments, the processor(s) can be configured to detect a ground fault on the circuit if an amount of the first leakage current exceeds a first threshold based on a let-go current threshold or other physiological condition(s). The processor can be configured to detect an excessive leakage current at the load if the second leakage current of the load exceeds a second threshold based on a maximum or upper range of the allowable/acceptable leakage current for the load. The load can comprise of HVAC equipment, the first current threshold can be in a first range of approximately 4 mA to approximately 6 mA, and the second current threshold can be in a second range of approximately 15 mA to approximately 20 mA where the maximum or upper range of the allowable/acceptable leakage current can be 15 mA.

In various embodiments, the load can comprise HVAC equipment or other outdoor electrical equipment with the allowable/acceptable leakage current under normal operation being greater than a let-go (or 6 mA) current level for the branch circuit or a current level based on other physiological condition(s).

In various embodiments, the device can further include a set of electrical contacts across which the power is supplied to the branch circuit, wherein the processor(s) is configured to enable or interrupt the supply of power, via a switch(es) or a trip mechanism, to the branch circuit.

In various embodiments, the device can further include a communication device or a local output device. The processor(s) can be further configured to output a report(s) or notification(s) to a remote computer device or system via the communication device or to the local output device. The report(s) or notification(s) can be associated with a monitored power, a status and/or diagnostics associated with the supply of power to the branch circuit or load. Furthermore, the report(s) or notification(s) can comprise a status notification to perform service or maintenance on the load or equipment associated therewith if the second leakage current is within a third threshold comprising a predefined current range or value before the second threshold, the third threshold being used to detect for the second leakage current approaching an excessive or abnormal level. The third current threshold can comprise a third range between approximately 10 mA to approximately 15 mA or a value within the third range.

In various embodiments, the processor(s) can be further configured to: monitor a pilot signal across a pilot signal wire, which is connected to a pilot control circuit within an enclosure of the load. The control pilot circuit can have an electrical component(s) with a predefined load profile that is connected between the pilot signal wire and the grounding conductor. The processor(s) also can further be configured to detect an impedance of a load profile of the control pilot circuit between the pilot signal wire and the grounding conductor using the monitored pilot signal; detect the grounding conductor being open, broken or improperly connected if the detected impedance of the load profile differs from an acceptable range of impedance for the predefined load profile; and control an interruption of the supply of power to the branch circuit if the grounding conductor is open, broken or improperly connected. In some embodiments, the electrical component(s) of the control pilot circuit can comprise a resistor and diode, which are connected in series. In addition, in some embodiments, the device can further include a communication device or a local output device. The processor(s) is further configured to output a notification to a remote computer device or system via the communication device or to the local output device, the notification indicating that the grounding conductor is open, broken or improperly connected.

In various embodiments, the line conductor(s) can comprise at least two line conductors. For example, the line conductors can be ungrounded conductor(s), grounded conductor(s), or a combination thereof. The device also can further include an arc fault protection subsystem, an overcurrent protection subsystem, and/or a short-circuit subsystem.

In various embodiments, the device can be a miniature circuit breaker or MCB. The device also can further include at least two line-side voltage terminals for plugging onto a load center; at least two load current carrying conductor terminals for branch circuit wire connections; at least one service entrance side grounding conductor wire connection; and at least one branch circuit side grounding conductor wire connection.

In accordance with an embodiment, a method is provided of interrupting a supply of power to a branch circuit that supplies power to a load. The circuit includes at least a line conductor(s) and a grounding conductor different from the line conductor(s). For example, the line conductors can include supply conductors, such as two or more ungrounded conductor or, a grounded conductor along with one or more ungrounded conductors. The method includes: monitoring, via a first ground fault sensor, an amount of a first leakage current across the line conductor(s) and the grounding conductor, the amount of the first leakage current ignoring leakage current across the grounding conductor; monitoring, via a second ground fault sensor, an amount of a second leakage current of the load across the line conductor(s)), the amount of the second leakage current taking into account leakage current across the grounding conductor; detecting, via a processor(s), for a ground fault on the branch circuit based on the amount of the first leakage current monitored by the first ground fault sensor; detecting, via the processor(s), for a ground fault at the load due to excessive leakage current based on the amount of the second leakage current and an allowable/acceptable amount of leakage current for the load under normal operation; and controlling, via the processor(s), an interruption of the supply of power to the branch circuit if the ground fault on the branch circuit or at the load is detected. In some embodiments, the load can have an allowable/acceptable leakage current under normal operation which is greater than a threshold for ground fault protection of the branch circuit.

In accordance with yet another embodiment, a device is provided for interrupting a supply of power to a branch circuit that supplies power to a load. The circuit includes at least two line conductors and a grounding conductor different from the at least two line conductors. For example, the line conductors can include supply conductors, such as two or more ungrounded conductor or, a grounded conductor along with one or more ungrounded conductors. The device includes at least one ground fault sensor comprising: a first ground fault sensor for monitoring an amount of a first leakage current across the at least two line conductors and the grounding conductor, the amount of the first leakage current ignoring leakage current across the grounding conductor, and/or a second ground fault sensor for monitoring an amount of a second leakage current of the load across the at least two line conductors, the amount of the second leakage current taking into account leakage current across the grounding conductor. The device further includes a processor(s) configured to: detect for at least one type of ground fault, the processor being configured to detect for a ground fault on the branch circuit based on the amount of the first leakage current monitored by the first ground fault sensor, and/or to detect for a ground fault at the load due to excessive leakage current based on the amount of the second leakage current and an allowable/acceptable amount of leakage current for the load under normal operation; and to control an interruption of the supply of power to the branch circuit if the at least one type of ground fault is detected. The load comprises an HVAC or other electrical equipment that has an allowable/acceptable leakage current under normal operation which is greater than a threshold for ground fault protection of the branch circuit.

In various embodiments, the at least one ground fault sensor can include the first and second ground fault sensors. The processor(s) can be configured to detect for a ground fault on the branch circuit based on the amount of the first leakage current monitored by the first ground fault sensor, and detect for a ground fault at the load due to excessive leakage current based on the amount of the second leakage current and an allowable/acceptable amount of leakage current for the load under normal operation.

In various embodiments, the processor(s) can be further configured to: monitor a pilot signal across a pilot signal wire, which is connected to a pilot control circuit within an enclosure of the load, the control pilot circuit having an electrical component(s) with a predefined load profile that is connected between the pilot signal wire and the grounding conductor; detect an impedance of a load profile of the control pilot circuit between the pilot signal wire and the grounding conductor using the monitored pilot signal; detect a grounding conductor being open, broken or improperly connected if the detected impedance of the load profile differs from an acceptable range of impedance for the predefined load profile; and control an interruption of the supply of power to the branch circuit if the grounding conductor is open, broken or improperly connected.

In accordance with another embodiment, a method is provided of interrupting a supply of power to a branch circuit that supplies power to a load. The circuit includes at least two line conductors and a grounding conductor different from the at least two line conductors. For example, the line conductors can include supply conductors, such as two or more ungrounded conductor or, a grounded conductor along with one or more ungrounded conductors. The method includes monitoring at least one type of leakage current, the monitoring comprising: monitoring via a first ground fault sensor an amount of a first leakage current across the at least two line conductors and the grounding conductor, the amount of the first leakage current ignoring leakage current across the grounding conductor, and/or monitoring via a second ground fault sensor an amount of a second leakage current of the load across the at least two line conductors, the amount of the second leakage current taking into account leakage current across the grounding conductor. The method further includes detecting via a processor(s) for at least one type of ground fault, the detecting comprising: detecting for a ground fault on the branch circuit based on the amount of the first leakage current monitored by the first ground fault sensor, and/or detecting for a ground fault at the load due to excessive leakage current based on the amount of the second leakage current and an allowable/acceptable amount of leakage current for the load under normal operation. The method also includes controlling via the processor(s) an interruption of the supply of power to the branch circuit if the at least one type of ground fault is detected. The load comprises HVAC equipment or other electrical equipment that has an allowable/acceptable leakage current under normal operation, which is greater than a threshold for ground fault protection of the branch circuit.

In various embodiments, the monitoring can include: monitoring via a first ground fault sensor an amount of a first leakage current across the at least two line conductors and the grounding conductor, and monitoring via a second ground fault sensor an amount of a second leakage current of the load across the at least two line conductors. The detecting can also include: detecting for a ground fault on the branch circuit based on the amount of the first leakage current monitored by the first ground fault sensor, and detecting for a ground fault at the load due to excessive leakage current based on the amount of the second leakage current and an allowable/acceptable amount of leakage current for the load under normal operation In various embodiments, the method can further include monitoring a pilot signal across a pilot signal wire, which is connected to a pilot control circuit within an enclosure of the load, the control pilot circuit having an electrical component(s) with a predefined load profile that is connected between the pilot signal wire and the grounding conductor; detecting an impedance of a load profile of the control pilot circuit between the pilot signal wire and the grounding conductor using the monitored pilot signal; detecting via the processor(s) a grounding conductor being open, broken or improperly connected if the detected impedance of the load profile differs from an acceptable range of impedance for the predefined load profile; and controlling an interruption of the supply of power to the branch circuit if the grounding conductor is open, broken or improperly connected.

It is understood that there are many features, advantages and aspects associated with the disclosed invention, as will be appreciated from the discussions below and drawings.

BRIEF DESCRIPTION OF THE DRAWINGS

The foregoing features of the disclosure, as well as the disclosure itself may be more fully understood from the following detailed description of the drawings, in which:

FIG. 14 shows a chart with different example configurations for different scenarios of ground fault detection and protection devices (or systems), in accordance with various embodiments of the present disclosure.

DETAILED DESCRIPTION OF EXAMPLE EMBODIMENTS

Figure 1:
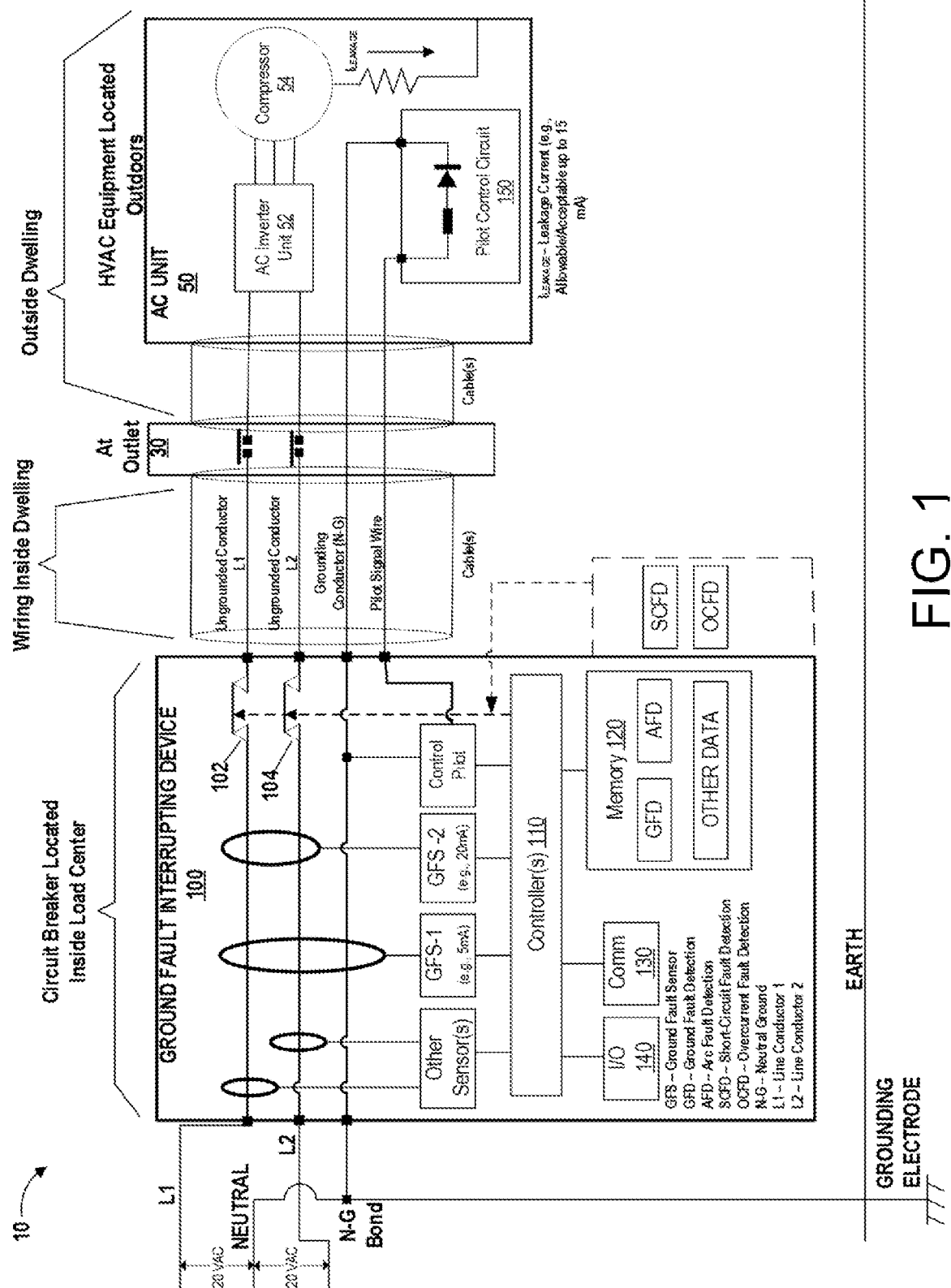
FIG. 1 shows an example of a ground fault detection and protection device (or system) for use with an electrical system including HVAC equipment in accordance with the first embodiment of the present disclosure.

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

In accordance with an embodiment, a system and method are provided for ground fault detection and protection of an electrical system, which can supply power to a load, such as HVAC equipment, across a branch circuit. The load may be located in an outdoor environment. The system and method can be implemented through a ground fault interrupting device or system (or other circuit protective device), such as a circuit breaker (e.g., a miniature circuit breaker or MCB), which may be located in a load center of a building, such as a house, dwelling or other structure. The system and method can allow for an appropriate level of leakage current internal to the HVAC equipment while providing protection for electric shock at a "let-go" level.

For example, in the system and method, the wiring of the branch circuit (also referred to as "branch circuit wiring") can be monitored and protected through the use of a first ground fault sensor that ignores the leakage current returning through the grounding conductor from the load. This first ground fault sensor can detect for any ground current flowing outside the system, such as from a line conductor(s) to Earth ground or from the line conductor(s) to other grounded equipment, which can be detected at the let-go level, e.g., 6 mA, or a current level based on other physiological condition(s). The line conductors can include supply conductors, such as two or more ungrounded conductor or, a grounded conductor along with one or more ungrounded conductors. In various embodiments, the let-go level (or threshold associated therewith) can be in the range of 4-6 mA. The system and method also can employ a separate, second ground fault sensor to monitor for excessive leakage current from the HVAC equipment, e.g., leakage current exceeding allowable, acceptable or normal leakage current under normal operation of the equipment. The second ground fault sensor can take into account the leakage current returning through the grounding conductor. In the event a ground fault is detected on the branch circuit or due to excessive leakage current from the load, the supply of power to the branch circuit and the load can be interrupted to de-energize the circuit and the load.

The system and method can allow, for example, up to 15 mA of line frequency leakage current to flow to ground within the HVAC equipment, which can allow the equipment to operate within the normal leakage current range, e.g., the allowable or acceptable (allowable/acceptable) leakage current range under normal operation of the equipment. The increased leakage current at the equipment can be safely returned through the grounding conductor. The allowable/acceptable leakage current can depend on the type of load or equipment thereof, the application, and other factors which may impact leakage current from the load.

The system and method also can provide a ground monitor (also referred to as a "ground monitor system"), which can continuously check that the grounding conductor is properly installed, e.g., properly connected. In some embodiments, the ground monitor can only allow the branch circuit feeding the equipment to be energized so long as a grounding conductor is properly connected to the equipment. The grounding conductor can ensure that a safe voltage is maintained on the equipment enclosure within the allowed range of leakage current. Alternatively, in some embodiments, the ground monitor can also be configured to check the grounding conductor periodically, in response to a user command or a remote-control (RC) command from a remote computer system, or according to a desired schedule.

The system and method may also include a power monitoring, status, or diagnostic function(s) that can provide information about the status of the detection and protection system, (e.g., circuit breaker or other circuit protective device) to the user or a central monitoring/management computer system, which in turn may inform the user or other facility. This information can be provided remotely through a communications device (or system) of the detection and protection system and/or locally through a user interface on the circuit breaker. The status or diagnostic information can provide the user with notifications or reports in the event of excessive (or abnormal) leakage current, such as for example when the HVAC leakage current exceeds an expected threshold range or value but is still below the level at which the device will trip to interrupt the supply of power to the branch circuit and the load.

The systems and methods of the present disclosure can provide various technical benefits and/or advantages. For example, the systems and methods can solve or address an existing compatibility problem between HVAC equipment (or equipment with similar leakage current issues) and GFCI protection that has prevented the wide adoption of GFCI protection for outdoor equipment. The systems and methods of the present disclosure can also allow the HVAC equipment to operate without tripping the ground fault protection while maintaining a let-go level of protection against electric shock for branch circuit conductors.

In various embodiments, in the system and method, the ground fault interrupting system for HVAC equipment can be a circuit breaker. The circuit breaker can include at least two levels of ground fault protection. For the first level, a first ground fault sensor (or sensing circuit) can be provided for detection of "let-go" level ground fault current, e.g. normally considered to be in a range of 4-6 mA, or a current level based on other physiological condition(s). This first ground fault sensor ignores leakage current returning through the grounding conductor, and is intended to provide "let-go" or other physiological-based or -type of ground fault protection for the branch circuit conductors. For the second level, a second ground fault sensor (or sensing circuit) can be provided for detection of higher levels of ground fault current in the range of 15 to 20 mA. This second ground fault sensor does not ignore the leakage current returning through the grounding conductor, and is intended to provide protection against excessive leakage current from the HVAC equipment.

In various embodiments, the circuit breaker can include a set of electrical contacts, which can be opened to disconnect/interrupt the line voltage from the branch circuit (and closed to connect/allow the line voltage to the branch circuit) in order to de-energize the circuit and connected load. The set of electrical contacts can be opened in response to the detection of a ground fault through the use of the first ground fault sensor or a second ground fault sensor. The circuit breaker can also include a ground monitor (e.g., a pilot monitor/pilot control) to detect or verify the presence of a properly connected grounding conductor between the circuit breaker and the HVAC equipment. The same electrical contacts as discussed above or a different set of electrical contacts can be opened in the event of a detected or verified ground fault, which is due to improperly connected grounding conductor, e.g., an opening, break or other improper connection of the grounding conductor.

In various embodiments, the circuit breaker can also implement arc fault protection, overcurrent protection, and/or short-circuit protection such as through subsystems thereof.

In various embodiments, the circuit breaker can include two or more line-side voltage terminals in the form of lugs or provisions for plugging onto a load center. The circuit breaker can also include two or more load current carrying conductor terminals for branch circuit wire connections. The circuit breaker can also include a service entrance side grounding conductor wire connection, a branch circuit side grounding conductor wire connection, and a ground monitor pilot signal wire connection.

In various embodiments, the ground fault interrupting device (or system) for HVAC equipment can include a pilot signal conductor connected between the circuit breaker pilot wire connection and the HVAC equipment. A pilot control circuit (also referred to as a pilot control wire termination circuit) can be located inside the HVAC equipment enclosure. The pilot control circuit can include a resistor and diode or other combination of electrical components that presents a unique loading characteristic to the ground monitor pilot signal. One side of the pilot wire termination of the pilot control circuit can be connected to the pilot wire coming from the circuit breaker pilot wire connection. A second side of the pilot wire termination can be bonded to the grounded chassis of the HVAC equipment.

In various embodiments, the ground monitor may be designed to detect an acceptably low impedance in the grounding conductor to verify a properly installed grounding conductor. The ground monitor can be designed with a grounding conductor impedance threshold that is low enough that a fault to ground in the equipment will be interrupted by the thermal or short-circuit response of the circuit breaker without the need for supplemental ground fault protection and without hazardous voltage being present on the HVAC equipment enclosure.

In various embodiments, the branch circuit wiring between the circuit breaker and HVAC equipment can include a minimum of at least two line conductors (e.g., load current carrying or line conductors), a grounding conductor, and a ground monitor pilot signal conductor (e.g., a pilot signal wire). The circuit breaker may include a communication device (e.g., wireless/wireline transmitter(s)/TX and receiver(s)/RX) for the purpose providing information (or data) of power monitoring, status, and diagnostics to a user device or other monitoring/management computer system. In some embodiments, the communications for status and diagnostics can include a communicated status of a service (or maintenance) notification, e.g., a notification of a need to perform servicing of the HVAC equipment, in the event the HVAC leakage current is detected as approaching an excessive or abnormal threshold range or value of leakage current (e.g., >10 mA but less than 15 mA). This power monitoring, status, and diagnostic information can also be outputted locally on the circuit breaker in the form of a user interface, such as a display and/or other visual indicators.

These and other example features of the systems and methods are described in detail below with reference to the figures.

FIG. 1 shows an example system environment 10 of a ground fault detection and protection system, such as a ground fault interrupting device 100 for use with an electrical system including HVAC (Heating, Ventilation, Air Conditioning) equipment in accordance with the first embodiment of the present disclosure. As shown in FIG. 1, the system environment 10 includes a branch circuit that supplies power from a power supply 20 to a load, such as an AC unit 50 of HVAC equipment, across an electrical outlet 30. The ground fault interrupting device 100 is connected between the power supply 20 and the branch circuit to provide, among other things, ground fault protection to the AC unit 50 and branch circuit wiring which is connected between the device 100 and the AC unit 50. In this example, the branch circuit wiring includes two line conductors, e.g., L1 and L2, and a grounding conductor. In this example, the HVAC equipment, e.g., the AC unit 50, is located outside of a dwelling, and the ground fault interrupting device 100 is a circuit breaker, which is located in a load center at the dwelling.

The power supply 20 supplies 120 VAC (Volts Alternating Current) across each line conductor L1 and L2 to Neutral (240 VAC L1 to L2), and its Neutral is connected/bonded to a grounding electrode to provide a grounding conductor. As shown, the line conductors L1 and L2, and the grounding conductor are connected to the device 100 (e.g., a circuit breaker), via connections/terminals of the device. The line conductors L1 and L2 and the grounding conductor of the device 100 are connected downstream to corresponding conductors of the branch circuit wiring, which in turn is connected to the load, e.g., AC unit 50 and its components.

The AC unit 50 is HVAC equipment, which includes various electrical and mechanical components housed in an enclosure. In this example, the AC unit 50 includes components such as an AC invertor unit 52, which is connected to the line conductors L1 and L2, and supply electrical power to a compressor 54. As discussed herein, HVAC equipment can have leakage current under normal operation. This allowable/acceptable leakage current (e.g., 15 mA to 20 mA) can exceed the "let-go" leakage current (e.g., 4 mA to 6 mA) of the branch circuit wiring and its conductors (e.g., L1, L2, etc.). In this example, the leakage current from the HVAC equipment, e.g., the AC unit 50, can be redirected from the HVAC equipment and its enclosure along a return path via the grounding conductor to provide protection against potential electrical hazards from such leakage current.

The AC unit 50 can also include a pilot control circuit 150 for use in facilitating the monitoring of the grounding conductor connection (e.g., a proper connection or an improper connection such as an open, broken or other improper connection of the grounding conductor). The pilot control circuit 150 can include electrical component(s) or a combination thereof, which can be selected for its unique impedance characteristics. In this example, the electrical components can include a resistor and diode, which are connected in series, and have a known predefined load profile. The terminal electrical components are connected between a pilot signal wire and the grounding conductor, both of which are connected between the device 100 and the AC unit 50. When the grounding conductor is improperly connected, the detected impedance of the load profile as seen between the pilot signal wire and the grounding conductor changes from the acceptable range of the predefined load profile of the electrical component(s). In this way, a ground monitor can be provided, such as in the device 100, to monitor the pilot signal and to detect for a ground fault due to improper connection of the grounding conductor based on the monitored pilot signal.

The ground fault interrupting device 100 can include a controller(s) 110, a memory 120, a communication device(s) 130, input/output (I/O) devices 140, and a plurality of sensors/monitors for monitoring energy-related signals across the wiring (e.g., the branch circuit wiring and pilot signal wire). In this example, the device 100 can be a circuit breaker, which can include a set of electrical contacts 102 for the first line conductor L1, and a set of electrical contacts 104 for the second line conductor L2, and can also include other conventional components of a circuit breaker such as: a power interruption system (e.g., a trip mechanism, solid-state switch(es), etc.) for opening both sets of electrical contacts to interrupt or turn OFF the flow of power to the branch circuit and load such as the AC unit 50, a handle or lever for resetting or turning ON/OFF the circuit breaker, Test function (e.g., Push-to-Test button or function), line-side electrical connectors/connections, load-side electrical connectors/connections, housing/enclosure, and other conventional circuit breaker components.

The sensors/monitors of the device 100 can include a first ground fault sensor (GFS-1), a second ground fault sensor (GFS-2) and a control pilot monitor (e.g., a ground monitor) connected to the pilot signal wire and the grounding conductor. The first ground fault sensor is configured to monitor (e.g., monitor, sense, measure, etc.) an amount of a first leakage current across the line conductors L1, L2 and the grounding conductor. The monitored first leakage current ignores leakage current across the grounding conductor, which is for example cancelled out by the first ground fault sensor as both the return path on the grounding conductor and the outgoing path on the line conductor(s) are being received and monitored by the ground fault sensor. The first leakage current is monitored to detect for a ground fault on the branch circuit wiring (e.g., ground fault between line conductors L1 or L2 and the Earth ground) if the leakage current exceeds a first threshold range or value, e.g., leakage current exceeding "let-go" current level such as 4-6 mA or current level based on other physiological condition(s). In this example, the first threshold can be a typical let-go level, such as 5 mA, and the first ground fault sensor GFS-1 can be referred to as GFID5. In various embodiments, the first threshold can be a current threshold value in the range of 4-6 mA, depending on load equipment specification, application, and/or other factors which may impact ground fault detection in the environment of the electrical system.

The second ground fault sensor (or GFS-2) is configured to monitor an amount of second leakage current across the line conductors L1, L2. The second leakage current takes into account leakage current across the grounding conductor. In this way, the second ground fault sensor can be used to monitor the amount of leakage current from the load (e.g., AC unit 50) across the grounding conductor. The second ground fault sensor can be used to monitor when such leakage current from the load is excessive or abnormal if the leakage current exceeds a second threshold range or value (e.g., leakage current exceeding a level associated with the allowable/acceptable or normal leakage current level). The second ground fault sensor also can be used to detect when such second leakage current is approaching or almost at an excessive or abnormal level using a third threshold, which is less than the second threshold. In this example, the second threshold can be 15 to 20 mA and the first ground fault sensor GFS-2 can be referred to as GFID20. The third threshold range of 10 to 15 mA or value within the range can be used to detect for the leakage current approaching or near excessive/abnormal level for notification and other purposes. In various embodiments, the second threshold can be based on at least the addition of the branch circuit wiring and the allowable/acceptable leakage current level of the load.

The pilot control monitor (as referred to as "Control Pilot" monitor in FIG. 1) is configured to monitor the load impedance between the pilot signal wire and the grounding conductor using the pilot signal in order to detect for any unacceptable changes in the impedance in comparison to a predefined load profile or acceptable range thereof for the electrical component(s) of the pilot control circuit 150 at the AC unit 50. In this way, it is possible to detect for improper connection of the grounding conductor (e.g., open, broken or improperly connected grounding conductor) if the monitored impedance is outside the acceptable impedance range or value of the predefined load profile.

The sensors/monitors can include other sensors for measuring energy-related signals (e.g., current, voltage, power, etc.) across the conductors, e.g., L1 and L2, or branch circuit wiring. These other sensors can be used to perform additional monitoring and diagnostics, including detection of other types of conditions (e.g., arc fault condition, overcurrent condition, short-circuit condition, normal/abnormal operating condition, power quality event(s), etc.) associated with the electrical system, the device 100, the branch circuit and/or the load.

The memory 120 can store various information, including programs, modules, code and other data for facilitating control and operation of the device 100, its components, and various functions and operations including ground fault detection and protection and other functions and operations described herein. As shown, the memory 120 can store programs, modules and/or code to enable the processor(s) 110 to perform various detection, protection and status/diagnostic notification methods and processes, including for example ground fault detection (GFD), arc fault detection (AFD), and the detection of other types of fault(s) or conditions on the device 100, the branch wiring and the load according to information monitored from the sensors/monitors. The other data can include the storage of status, diagnostic and other information to be reported to the user or a remote monitoring/managing computer system, parameters associated with the detection of conditions (e.g., threshold ranges, levels or values associated with the various types of fault detection described herein, predefined load/impedance profile for pilot monitoring, etc.), device/component(s) operating parameters and settings, and other data as described herein.

The communication device(s) 130 can include wireless and wireline transmitters and receivers (TX/RX), such as RF transmitters/receivers, which can implement communications with other remote devices and systems using suitable wireless/wireline communication protocols.

The input/output (I/O) devices 140 can include input devices such as a user interface including: graphical user interface (GUI), handle, button(s), switch(es), dial(s), touch screen, microphone, and/or other input devices which may be used in conventional circuit breakers or circuit protective devices. The input/output devices 140 also can include output devices such as a display, speaker, LED(s), handle position, other visual indicators, and/or other output devices which may be used in conventional circuit breakers or circuit protective devices.

The controller(s) 110 can include processor(s) and other electronic components, and can be configured to control and manage the operations of the various components of the device 100, as well as the various functions and operations of the device 100 including those described herein. The functions and operations can, for example, include: various fault detection/protection processes, algorithms and methods, such as different types of ground fault detection (GFD) and protection, arc fault detection (AFD) and protection, and the detection of other conditions on the device 100, the branch wiring circuit and the load, and any other detection and protection as described herein; monitoring, storing and outputting/transmitting (e.g., outputting, notifying, reporting, transmitting, etc.) of status, diagnostic and other information for the electrical system, the device 100, the branch wiring and the load; controlling the supply of power to the branching wiring and the load such as controlling the operation of interrupting/turning OFF and connecting/turning ON the supply of power to the branch circuit wiring and the load; controlling and performing conventional functions and operations of circuit breakers, and/or other functions and operations as described herein.

In various embodiments, the controller(s) 110 or its processor(s) can be configured to: detect for a ground fault on the branch circuit based on the amount of the first leakage current monitored by the first ground fault sensor; detect for a ground fault at the load due to excessive leakage current based on the amount of the second leakage current and an allowable/acceptable amount of leakage current for the load under normal operation; and to control an interruption of the supply of power to the branch circuit (e.g., to de-energize the circuit and connected load) if the ground fault on the branch circuit or at the load is detected. The first leakage current can be compared to a first threshold to detect for a ground fault on the branch circuit (e.g., a ground fault from L1 or L2 to Earth ground). The first threshold can be associated with a let-go current level or other physiological-based current level for the branch circuit. The second leakage current can be compared to a second threshold to detect for a ground fault due to excessive or abnormal leakage current from the load. The second threshold can be associated with the allowable, acceptable or normal leakage current level of the load or equipment thereof (e.g., AC unit 50), and may also take into account let-go current or other physiological condition(s) when the first and second ground fault sensors are used in cooperation to detect for different types of ground fault current on the electrical system.

In various embodiments, the controller(s) 110 or its processor(s) can be configured to output a report(s) or notification(s) to a remote computer device or system via the communication device or to the local output device. The report(s) or notification(s) can be associated with a status and/or diagnostics associated with the supply of power to the branch circuit or load, or other monitored energy-related characteristics, operations or components of the electrical system. The report(s) or notification(s) can include a status notification to perform service or maintenance on the load or equipment associated therewith if the second leakage current associated with the load is approaching an excessive or abnormal level, for example, in relation the third threshold (e.g., a predefined current range or value before the second threshold).

In various embodiments, the controller(s) 110 or its processor(s) can be further configured to monitor a pilot signal across a pilot signal wire, using a pilot monitor (or circuit thereof). The pilot monitor (or sensor) is connected to a pilot control circuit, which is located within an enclosure of the load (e.g., AC unit 50). As previously discussed, the control pilot circuit in the load enclosure can have an electrical component(s) with a predefined load profile that is connected between the pilot signal wire and the grounding conductor. The controller(s) 110 can detect for an impedance of a load profile of the control pilot circuit between the pilot signal wire and the grounding conductor using the monitored pilot signal; detect for the grounding conductor being open, broken or improperly connected if the detected impedance of the load profile is different than an acceptable range of impedance for the predefined load profile; and control an interruption of the supply of power to the branch circuit (e.g., to de-energize the circuit and connected load) if the grounding conductor is open, broken or improperly connected.

In various embodiments, the ground fault interrupting device 100 can also be configured to provide for detection and protection of other types of faults and conditions, such as short-circuit fault detection (SCFD) and protection, and/or overcurrent fault detection (OCFD) and protection. The SCFD and OCFD and protection thereof can be provided as or through separate electromechanical functions/components, for example, using conventional SC and OC electromechanical functions/components. Alternatively, such detection and protection functionality may be provided through or in cooperation with the controller(s) 110 and memory 120 which may store executable code or programs for implementing such detections/protections process, algorithm or method.

Various example operational modes of the ground fault interrupting device 100 of FIG. 1 are described in different scenarios of the system environment 10, which are discussed below with reference to FIGS. 2, 3, 4, 5, 6 and 7.

Figure 2:
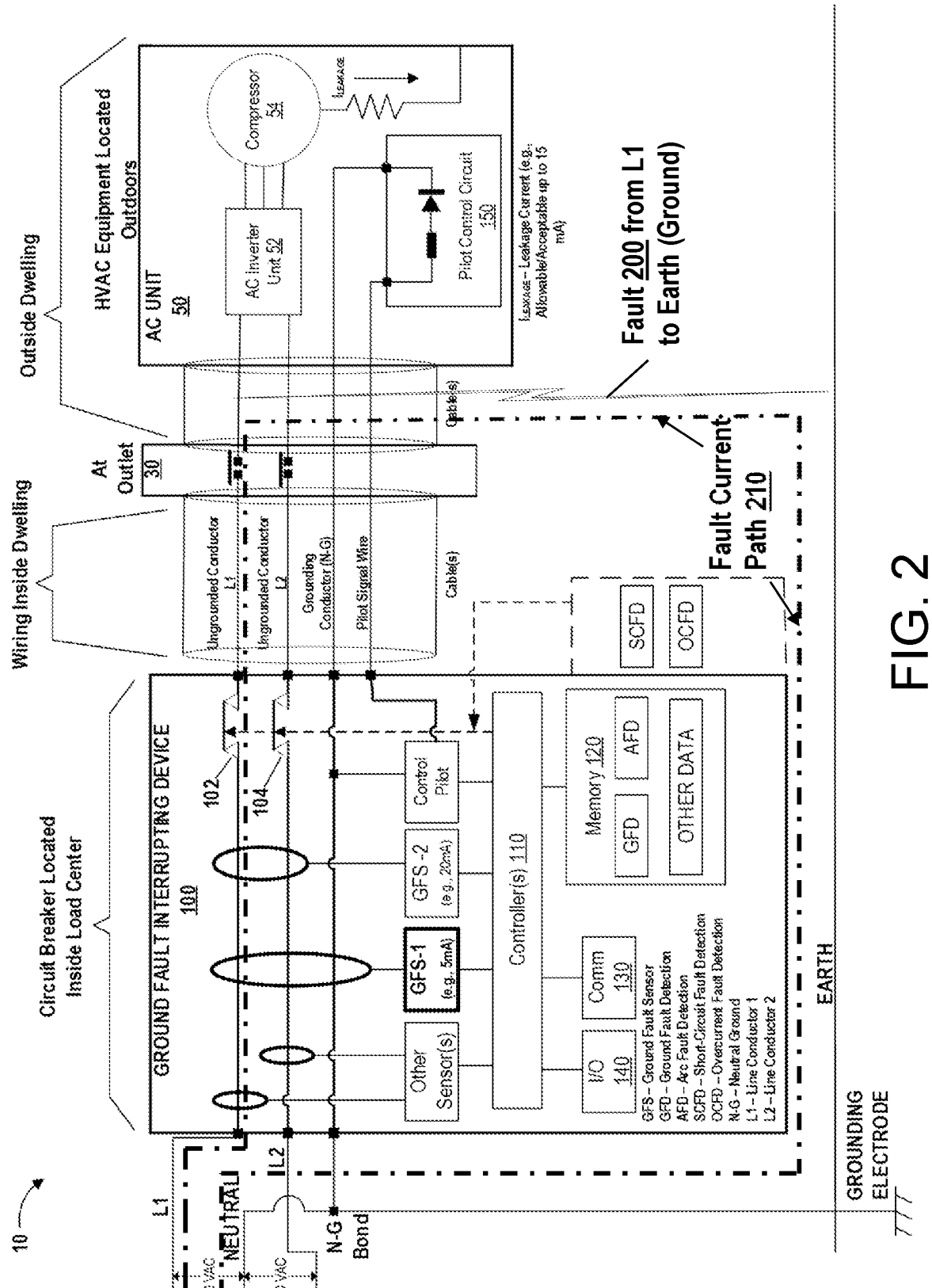
FIG. 2 shows an example scenario for the ground fault detection and protection device (or system) of FIG. 1 in which a ground fault occurs on a first line conductor of a branch circuit of the electrical system, in accordance with the first embodiment of the present disclosure.

FIG. 2 shows an example scenario for the ground fault interrupting device 100 of FIG. 1 in which a ground fault occurs on a first line conductor L1 of the branch circuit of the electrical system, in accordance with the first embodiment of the present disclosure.

In this scenario, there is a ground fault 200 between the line conductor L1 and the Earth ground, with a fault current path 210. The leakage current across the line conductors L1, L2 exceeds the let-go level, in this example at or over 5 mA. As previously explained, the first ground fault sensor GFS-1 leakage current monitors the leakage current across the line conductors L1, L2 and ignores leakage current across the grounding conductor (e.g., the leakage current on the grounding conductor is cancelled in the monitoring operation of the sensor GFS-1). The sensor GFS-1 detects leakage current across the line conductors, e.g., L1, at or over 5 mA along the fault current path 210. The controller(s) 110 detects the occurrence of a ground fault 200 on the line conductors because the monitored leakage current by the sensor GFS-1 is at or exceeds a first threshold associated with the let-go current level, e.g., the monitored leakage current is equal or greater than 5 mA let-go level. In response to the ground fault detection, the controller(s) 110 controls the electrical contacts 102, 104 to open, which in turn interrupts the supply of power from the power supply 20 to the branch circuit and the load, e.g., the AC unit 50, and de-energizes the circuit and connected load.

Figure 3:
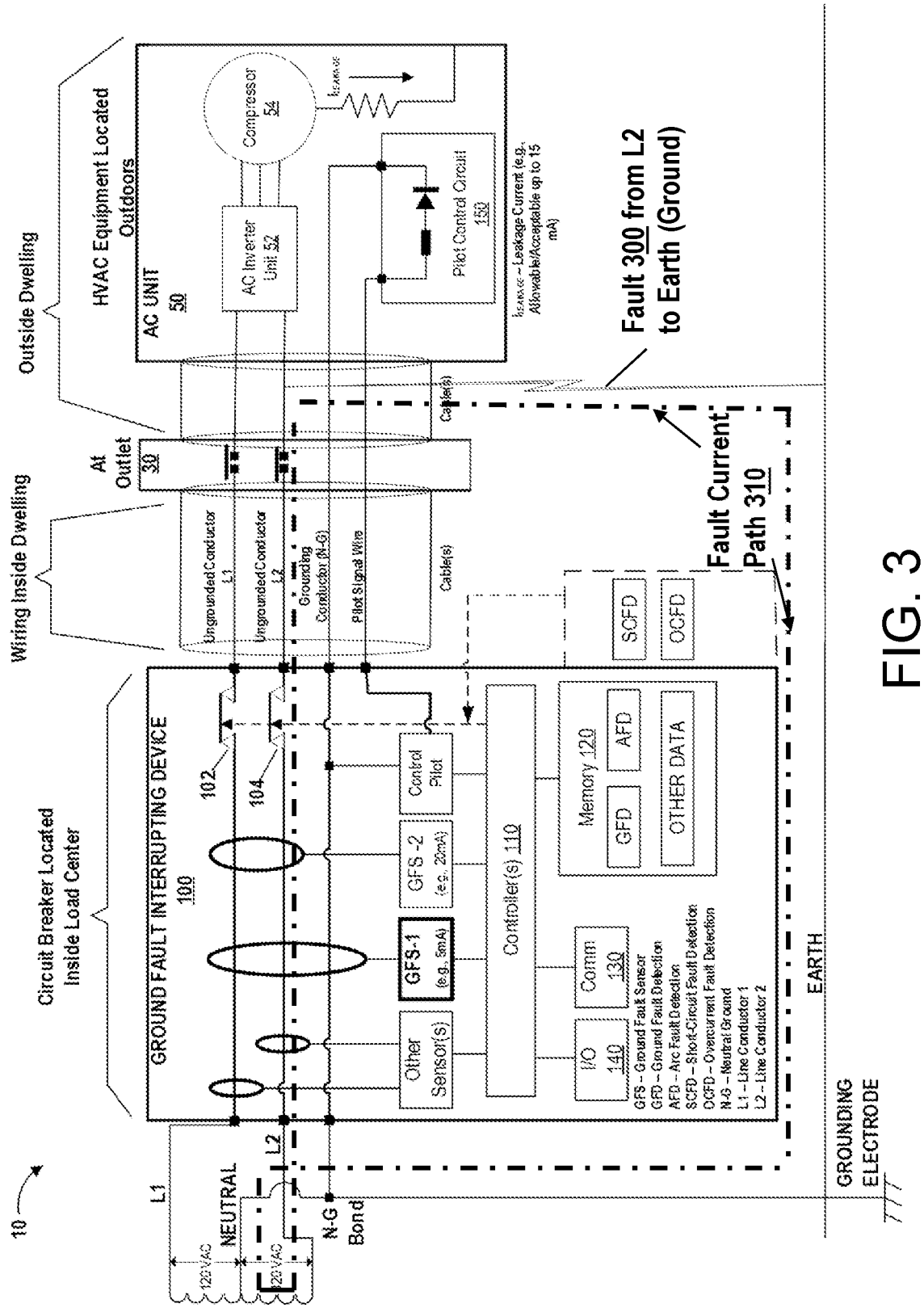
FIG. 3 shows an example scenario for the ground fault detection and protection device (or system) of FIG. 1 in which a ground fault occurs on a second line conductor of a branch circuit of the electrical system, in accordance with the first embodiment of the present disclosure.

FIG. 3 shows an example scenario for the ground fault interrupting device 100 of FIG. 1 in which a ground fault occurs on a second line conductor L2 of a branch circuit of the electrical system, in accordance with the first embodiment of the present disclosure.

In this scenario, there is a ground fault 300 between the line conductor L2 and the Earth ground, with a the fault current path 310. The leakage current across the line conductors L1, L2 exceeds the let-go level, in this example at or over 5 mA. As previously explained, the first ground fault sensor GFS-1 monitors the leakage current across the line conductors L1, L2 and ignores leakage current across the grounding conductor (e.g., the leakage current on the grounding conductor is cancelled in the monitoring operation of the sensor GFS-1). The sensor GFS-1 detects leakage current across the line conductors, e.g., L2, at or over 5 mA along the fault current path 310. The controller(s) 110 detects the occurrence of a ground fault 300 on the line conductors because the monitored leakage current by the sensor GFS-1 is at or exceeds a first threshold associated with the let-go current level, e.g., the monitored leakage current is equal or greater than 5 mA let-go level. In response to the ground fault detection, the controller(s) 110 controls the electrical contacts 102, 104 to open, which in turn interrupts the supply of power from the power supply 20 to the branch circuit and the load, e.g., the AC unit 50, and de-energizes the circuit and connected load.

Figure 4:
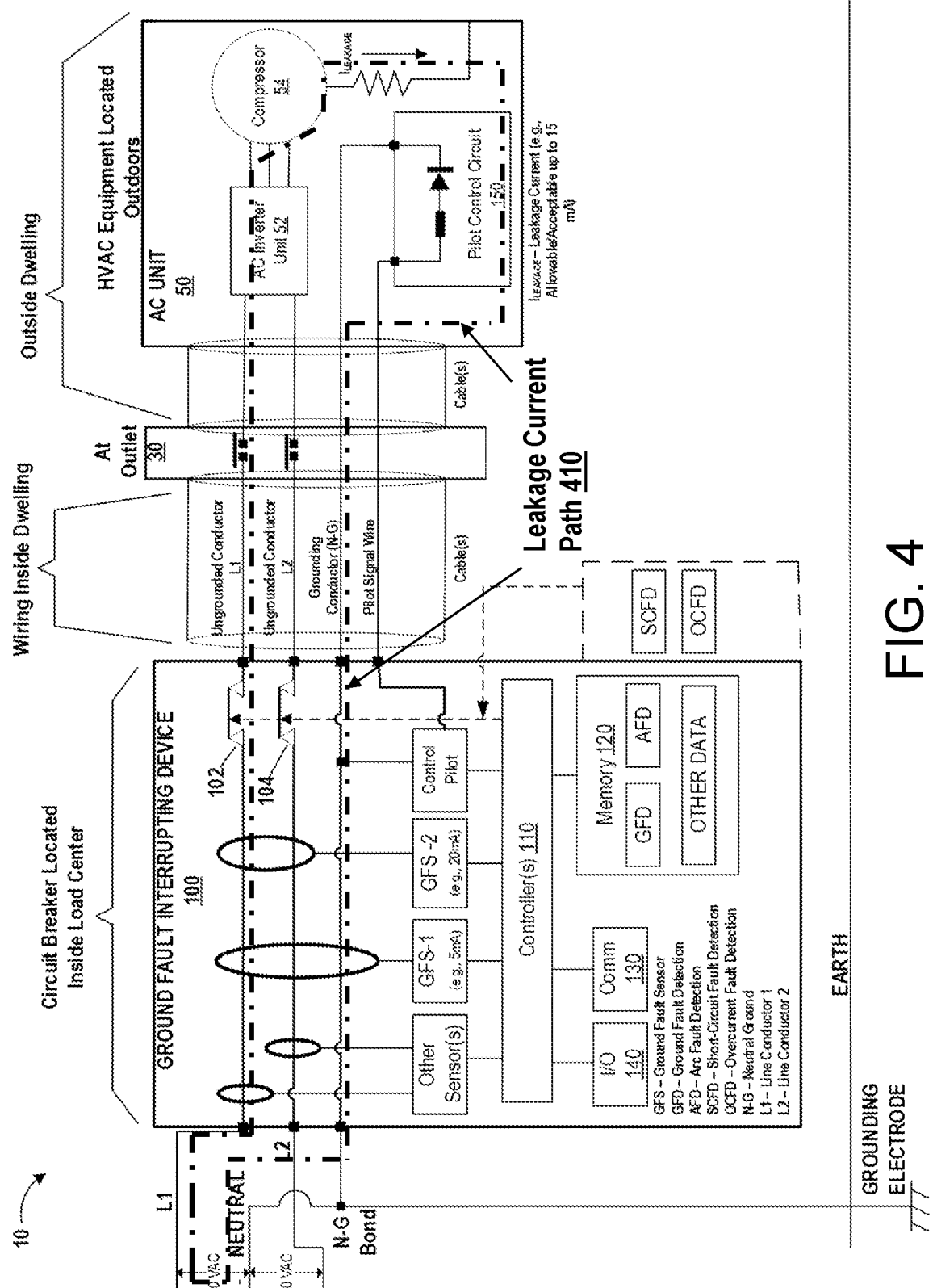
FIG. 4 shows an example scenario for the ground fault detection and protection device (or system) of FIG. 1 in which the leakage current from the load is at a normal level on the electrical system, in accordance with the first embodiment of the present disclosure.

FIG. 4 shows an example scenario for the ground fault interrupting device 100 of FIG. 1 in which the leakage current from the load across the grounding conductor is at an allowable, acceptable or normal level on the electrical system, in accordance with the first embodiment of the present disclosure.

In this scenario, there is leakage current flowing from the load, e.g., the AC unit 50, along a leakage current path 410 including the grounding conductor and the line conductor L1. The leakage current is below a detection level associated with allowable or acceptable leakage current for the load, such as a second threshold. As previously discussed, the first ground fault sensor GFS-1 ignores leakage current from the grounding conductor along the leakage current path 410 (e.g., the leakage current on the grounding conductor is cancelled in the monitoring operation of the sensor GFS-1). However, the second ground fault sensor GFS-2 detects the leakage current from the grounding conductor, in this example below 15 mA to 20 mA, which is the second threshold. Accordingly, the controller(s) 110 does not detect a ground fault due to excessive or abnormal level of leakage current from the load based on the monitored leakage current by the sensor GFS-2 because the monitored leakage current across the grounding conductor is below the second threshold. In this example, the second threshold can be 15 mA to 20 mA, or a variation thereof.

Figure 5:
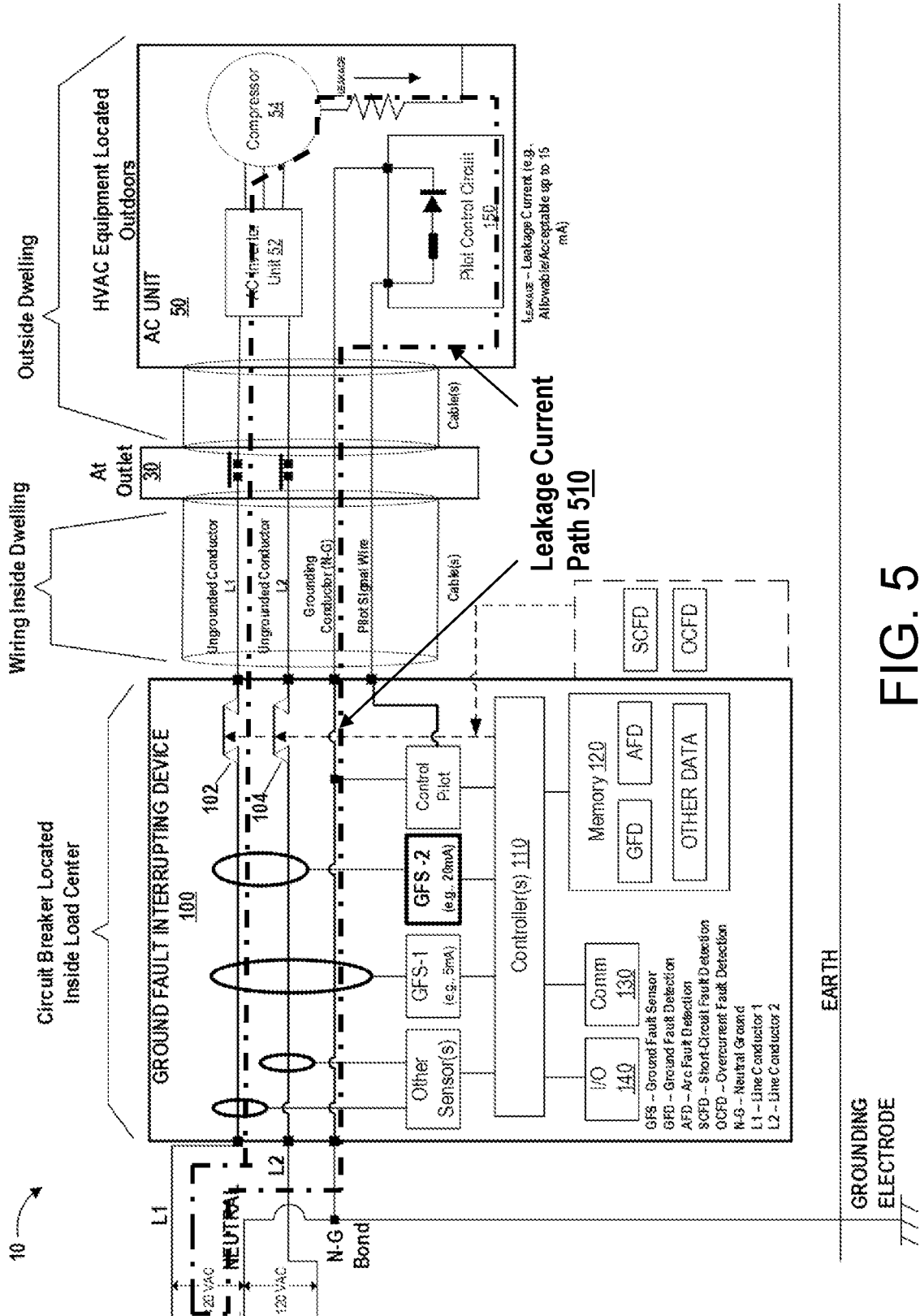
FIG. 5 shows an example scenario for the ground fault detection and protection device (or system) of FIG. 1 in which the leakage current from the load is at an excessive, abnormal level on the electrical system, in accordance with the first embodiment of the present disclosure.

FIG. 5 shows an example scenario for the ground fault interrupting device 100 of FIG. 1 in which the leakage current from the load across the grounding conductor is at an excessive or abnormal level on the electrical system, in accordance with the first embodiment of the present disclosure.

In this scenario, there is leakage current flowing from the load, e.g., the AC unit 50, along a leakage current path 510 including the grounding conductor and the line conductor L1. The leakage current is above a detection level associated with allowable or acceptable leakage current for the load, such as a second threshold (e.g., 15 mA to 20 mA). As previously discussed, the first ground fault sensor GFS-1 ignores leakage current from the grounding conductor along the leakage current path 510 (e.g., the leakage current on the grounding conductor is cancelled in the monitoring operation of the sensor GFS-1). However, the second ground fault sensor GFS-2 detects the leakage current from the grounding conductor, in this example which is above the second threshold, e.g., 20 mA. The second threshold can be the allowable/acceptable leakage current level, e.g., 15 mA-to 20 mA, or a variation thereof. Accordingly, the controller(s) 110 detects a ground fault due to an excessive or abnormal level of leakage current from the load based on the monitored leakage current by the sensor GFS-2 because the monitored leakage current is above the second threshold (e.g., >20 mA). In response to the ground fault detection, the controller(s) 110 controls the electrical contacts 102, 104 to open, which in turn interrupts the supply of power from the power supply 20 to the branch circuit and the load, e.g., the AC unit 50, and de-energizes the circuit and connected load.

Figure 6:
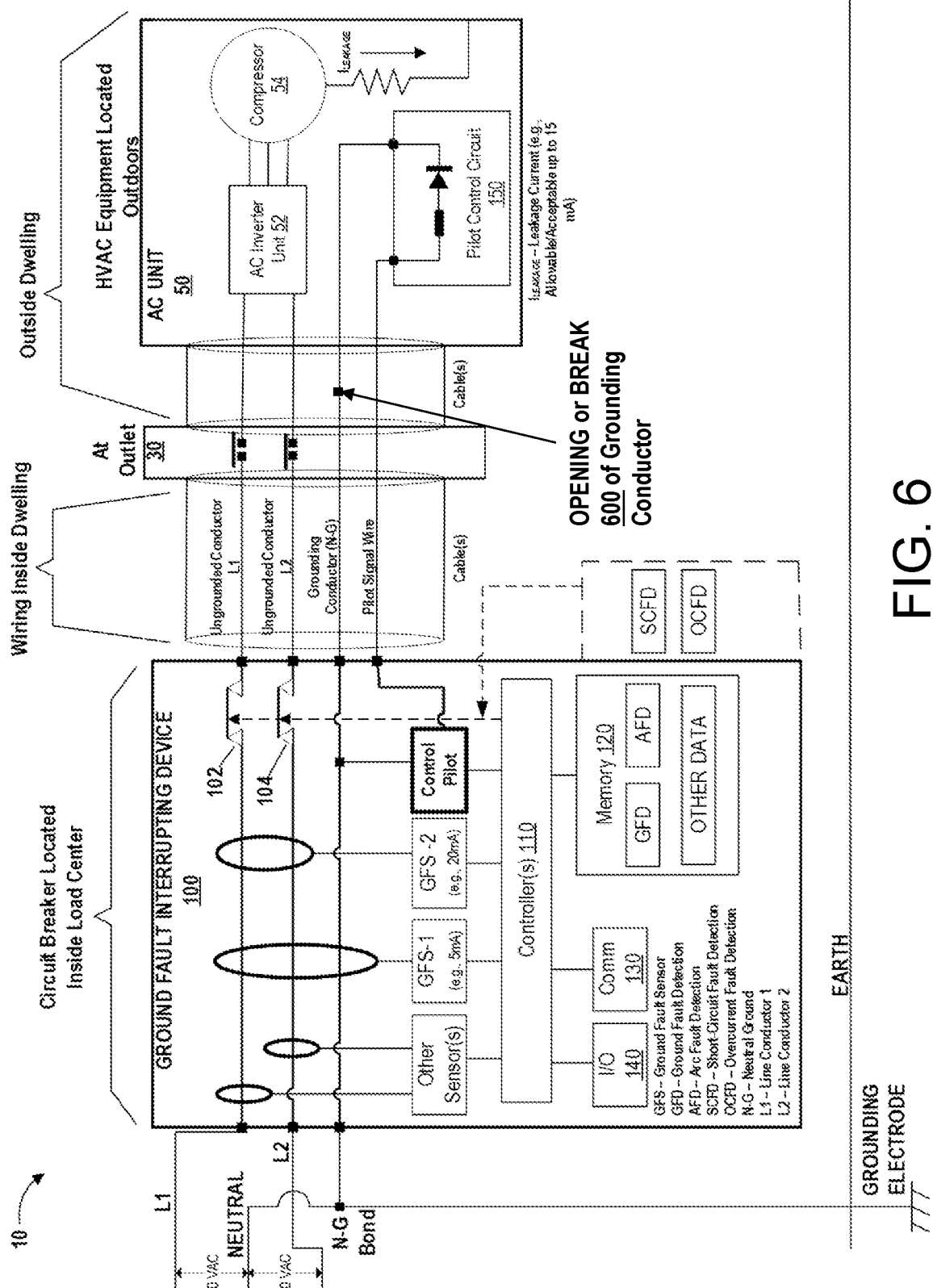
FIG. 6 shows an example scenario for the ground fault detection and protection device (or system) of FIG. 1 in which an opening or breaking of the grounding conductor occurs on the electrical system, in accordance with the first embodiment of the present disclosure.

FIG. 6 shows an example scenario for the ground fault interrupting device 100 of FIG. 1 in which an opening or breaking 600 of the grounding conductor occurs on the electrical system, in accordance with the first embodiment of the present disclosure.

In this scenario, there is an improper connection of the grounding conductor, such as an opening or break 600 of the grounding conductor. The ground monitor (Control Pilot monitor) can monitor the pilot signal across the pilot signal wire for the purposes of monitoring an impedance of the load profile of the terminal electrical component(s) of the pilot circuit 150 between the pilot signal wire and the grounding conductor. In this case, the monitored pilot signal reflects a change of impedance from an acceptable range of the predefined load profile as a result of the improper connection of the grounding connector, e.g., opening or break 600 on the grounding conductor of the pilot signal circuit. Accordingly, the controller(s) 110 detects a ground fault due to the improper connection of grounding conductor, or open pilot signal circuit. In response to the ground fault detection, the controller(s) 110 controls the electrical contacts 102, 104 to open, which in turn interrupts the supply of power from the power supply 20 to the branch circuit and the load, e.g., the AC unit 50, and de-energizes the circuit and connected load.

Figure 7:
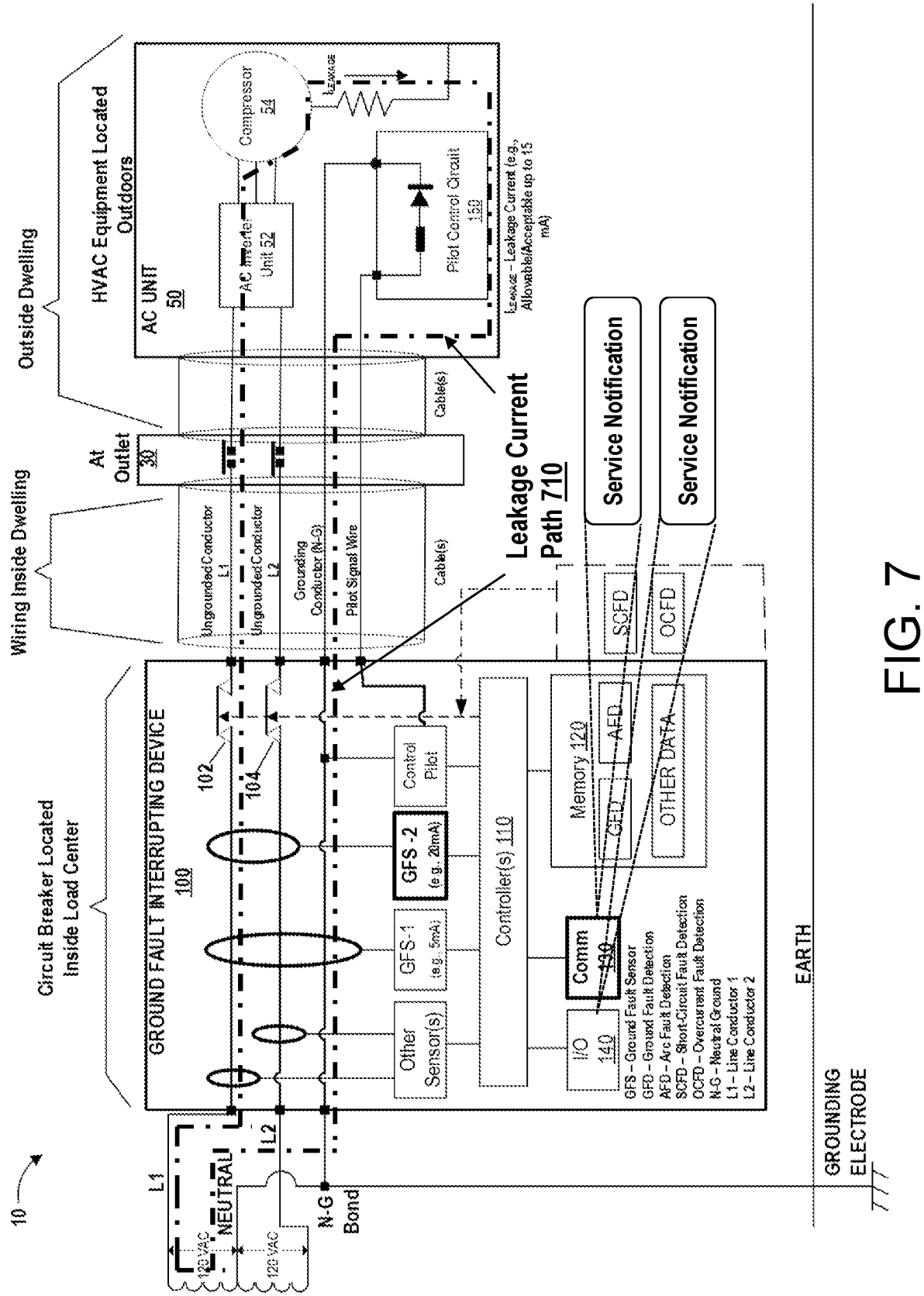
FIG. 7 shows an example scenario for the ground fault detection and protection device (or system) of FIG. 1 in which the leakage current is at warning or reporting level, which is prior to an abnormal level, for which service notification is implemented, in accordance with the first embodiment of the present disclosure.

FIG. 7 shows an example scenario for the ground fault interrupting device 100 of FIG. 1 in which the leakage current from the load across the grounding conductor is approaching or near an excessive or abnormal level, but has not yet exceeded such level (e.g., slightly below such level), in accordance with the first embodiment of the present disclosure. In this case, a service notification can be provided to a user or remote monitoring/management computer system.

For example, in this scenario, there is leakage current flowing from the load, e.g., the AC unit 50, along a leakage current path 710 including the grounding conductor and the line conductor L1. The leakage current is within a detection level associated with allowable or acceptable leakage current for the load, such as below the second threshold (e.g., 20 mA); however, the leakage current is approaching an excessive or abnormal level which is reflected by a third threshold, e.g., a range of 10 to 15 mA. As previously discussed, the first ground fault sensor GFS-1 ignores leakage current from the grounding conductor along the leakage current path 710 (e.g., the leakage current on the grounding conductor is cancelled in the monitoring operation of the sensor GFS-1). However, the second ground fault sensor GFS-2 detects the leakage current from the grounding conductor, in this example which is within the third threshold (e.g., 10 mA to 15 mA) but below the second threshold, e.g., 20 mA. The second threshold can be the allowable/acceptable leakage current level, e.g., 15 mA to 20 mA, or a variation thereof. Accordingly, the controller(s) 110 detects a leakage current from the load across the grounding conductor which is within the third threshold (but below the second threshold), thereby indicating that the leakage current is approaching or near the excessive or abnormal level and may require some action to be taken. In response to the detection of the leakage current within the third threshold, the controller(s) 110 can output a status notification, such as a Service Notification, on the user interface of the device 100 via the I/O 140 or to a user/user device or remote monitoring/management computer system via the communication device(s) 130. The Service Notification can be a request for servicing or maintenance of the equipment at the load (e.g., the AC unit 50).

Figure 8A:
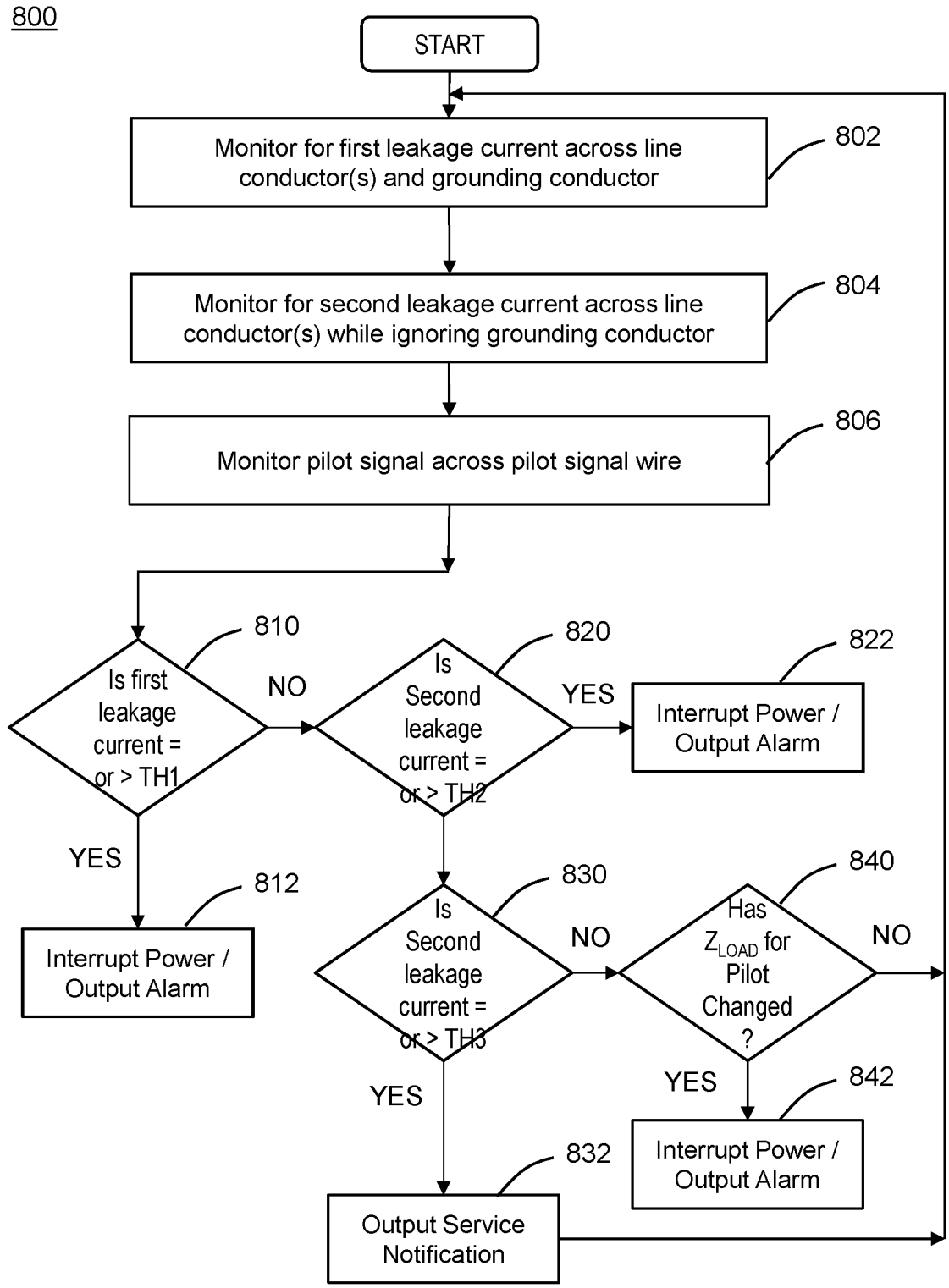
FIG. 8A illustrates a flow diagram of an example process for detecting and protecting against different types of ground faults on an electrical system, in accordance with embodiments of the disclosure.

FIG. 8A illustrates a flow diagram of an example process for detecting and protecting against different types of ground faults on an electrical system, in accordance with embodiments of the disclosure. For the purposes of example explanation, the process 800 will be described with reference to the ground fault interrupting device 100 of FIG. 1 (e.g., 100), such as in the form of a circuit breaker, along with its components such as the controller(s) (e.g., 110) and sensors/monitors, etc.

The process begins at block 802 in which the circuit breaker monitors a first leakage current (or first type thereof) across the line conductor(s) and grounding conductor using a first ground fault sensor (e.g., GFS-1). The first ground fault sensor is configured to ignore leakage current across the grounding conductor from the load.

At block 804, the circuit breaker monitors a second leakage current (or second type thereof) across the line conductor(s) using a second ground fault sensor (e.g., GFS-2). The second ground fault sensor is configured to take into account leakage current across the grounding conductor from the load.

At block 806, the circuit breaker monitors the pilot signal across a pilot signal wire using a ground (or pilot) monitor or circuit thereof.

At block 810, the circuit breaker determines if the monitored first leakage current satisfies (e.g., greater than or equal to, etc.) a first threshold TH1, which is associated with a let-go current level or other physiological-based current level of the branch circuit or wiring thereof. If so, the circuit breaker detects an occurrence of a ground fault on the branch circuit wiring (e.g., ground fault between the line conductor(s) and Earth ground). In response to the ground fault detection, the circuit breaker interrupts the supply of power (e.g., power, current, voltage, etc.) to the branch circuit and load, thereby de-energizing the circuit and connected load, at block 812, At block 812, the circuit breaker can also output a status notification such as a Ground Fault (GF) Alarm or type thereof, e.g., output locally through the user interface (e.g., via the I/O 140) or output to the user/user device or remote monitoring/management computer system (e.g., via the communication device 130).

Otherwise, if the first leakage current is below the first threshold at block 810, the process 800 proceeds to block 820 in which the circuit breaker determines if the monitored second leakage current satisfies (e.g., greater than or equal to, etc.) a second threshold, which is associated with allowable/acceptable (or excessive/abnormal) leakage current from the load across the grounding conductor. If so, the circuit breaker detects an occurrence of a ground fault due to excessive/abnormal leakage current from the load. In response to the ground fault detection, the circuit breaker interrupts the supply of power (e.g., power, current, voltage, etc.) to the branch circuit and load, thereby de-energizing the circuit and connected load, at block 822, At block 822, the circuit breaker can also output a status notification such as a Ground Fault (GF) Alarm or type thereof, e.g., output locally through the user interface (e.g., via the I/O 140) or output to the user/user device or remote monitoring/management computer system (e.g., via the communication device 130).

Turning back to block 820, if the second leakage current is below the second threshold TH2, the process 800 proceeds to block 830 in which the circuit breaker determines if the monitored second leakage current satisfies (e.g., greater than or equal to, etc.) a third threshold. The third threshold is associated with an indication that the second leakage current is approaching or near an excessive/abnormal level but has not reached such level (e.g., the second TH2), and some action may need to be taken. If the second leakage current satisfies the third threshold TH3 (and is below the second threshold TH2), the circuit breaker detects that the second leakage current from the load is approaching the excessive/abnormal level. In response to such detection, the circuit breaker outputs a status notification, such as a Service Notification, at block 832. The Service Notification can be output locally through the user interface (e.g., via the I/O 140) or output to the user/user device or remote monitoring/management computer system (e.g., via the communication device 130). Thereafter, the process 800 can proceed back to block 802 to continue the process.

Turning back to block 830, if the second leakage current is below the third threshold (TH3) at block 830, the process 800 proceeds to block 840 in which the circuit breaker determines if the impedance of the load between the pilot signal wire and the grounding conductor has changed from an acceptable range of the predefined load profile using the monitored pilot signal. If so, the circuit breaker detects an occurrence of a ground fault due to improper connection of the grounding conductor (e.g., open, broken or other improper connection of the grounding conductor, or an open pilot signal circuit). In response to the ground fault detection, the circuit breaker interrupts the supply of power (e.g., power, current, voltage, etc.) to the branch circuit and load, thereby de-energizing the circuit and connected load, at block 842. At block 842, the circuit breaker can also output a status notification such as a Ground Fault (GF) Alarm or type thereof, e.g., output locally through the user interface (e.g., via the I/O 140) or output to the user/user device or remote monitoring/management computer system). Otherwise, if the impedance of the load is within an acceptable range of the predefined load profile, the process 800 proceeds back to block 802 to continue the process.

While the process 800 describes examples of three types of ground fault (GF) detection performed by the process, a circuit breaker or other protective device as described herein can be configured to perform any combination of the different types of GF detection and protection as described in the process 800 in accordance with various embodiments.

Figure 8B:
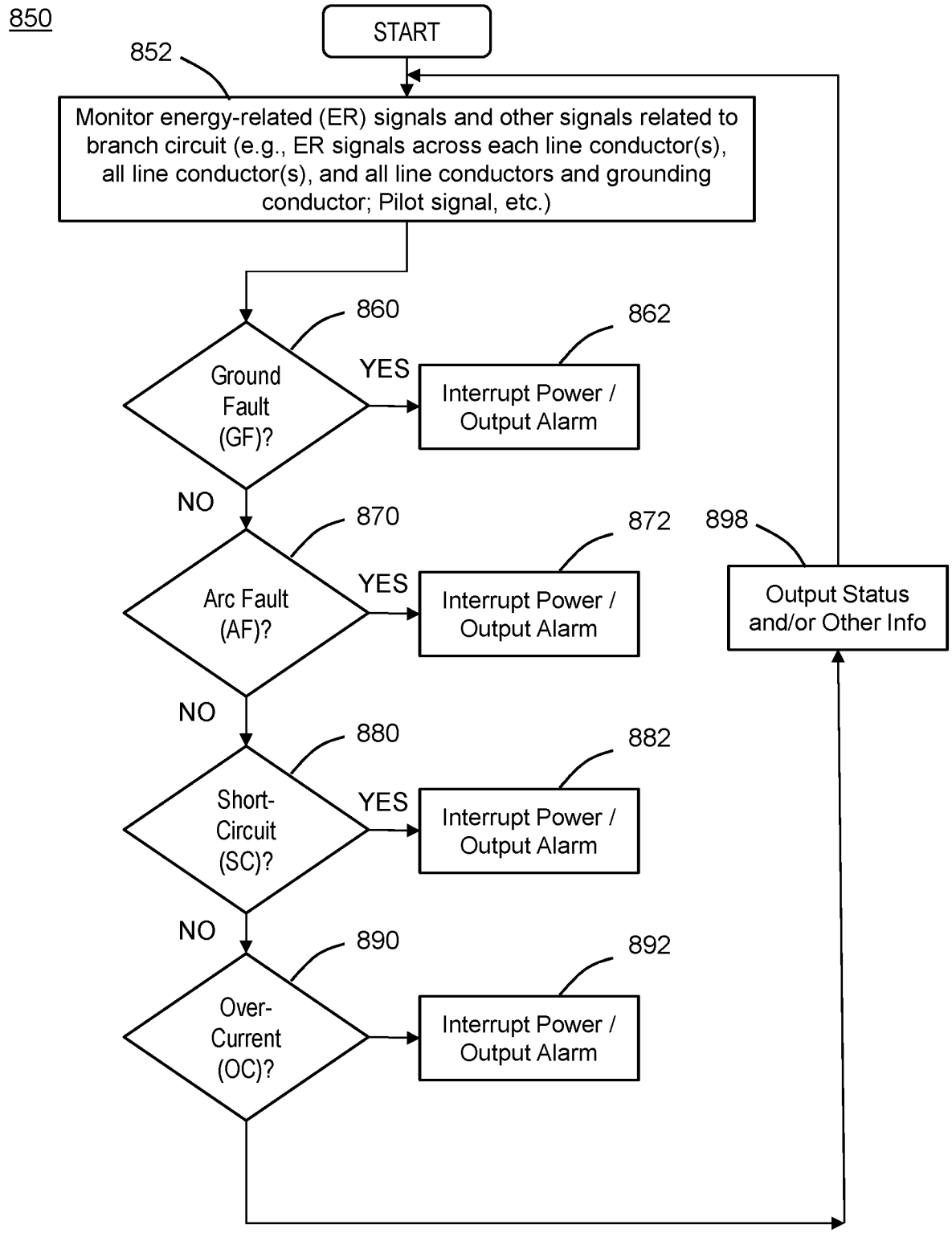
FIG. 8B illustrates a flow diagram of an example process for detecting and protecting against different types of faults and conditions on an electrical system, in accordance with embodiments of the disclosure.

FIG. 8B illustrates a flow diagram of an example process 850 for detecting and protecting against different types of faults and conditions on an electrical system, in accordance with embodiments of the disclosure. For the purposes of example explanation, the process 850 will be described with reference to the ground fault interrupting device 100 of FIG. 1 (e.g., 100), such as in the form of a circuit breaker, along with its components such as the controller(s) (e.g., 110) and sensors/monitors, etc.

The process begins at block 852 in which the circuit breaker can monitor various energy-related (ER) signals and other signals related to the protected branch circuit, using a plurality of sensors/monitors including current sensors, voltage sensors, pilot monitor (or sensor), and so forth. The monitored signals can include energy-related signals, such as current, voltage, power, etc., across each line conductor(s), all line conductor(s), and all line conductors and the grounding conductor; as well as other signals such as a pilot signal, and so forth.

At block 860, the circuit breaker can perform ground fault detection and protection by analyzing the monitored energy-related signals, such as described herein. In response to the ground fault detection, the circuit breaker interrupts the supply of power (e.g., power, current, voltage, etc.) to the branch circuit and load, thereby de-energizing the circuit and connected load, at block 862, At block 862, the circuit breaker can also output a status notification such as a Ground Fault (GF) Alarm or type thereof, e.g., output locally through the user interface (e.g., via the I/O 140) or output to the user/user device or remote monitoring/management computer system).

If a ground fault is not detected at block 860, the circuit breaker can perform arc fault detection and protection for the branch circuit by analyzing the monitored energy-related signals, at block 870. In response to an arc fault detection, the circuit breaker interrupts the supply of power (e.g., power, current, voltage, etc.) to the branch circuit and load, thereby de-energizing the circuit and connected load, at block 872, At block 872, the circuit breaker can also output a status notification such as Arc Fault (AF) Alarm or type thereof, e.g., output locally through the user interface (e.g., via the I/O 140) or output to the user/user device or remote monitoring/management computer system).

If an arc fault is not detected at block 870, the circuit breaker can perform short-circuit fault detection and protection for the branch circuit by analyzing the monitored energy-related signals, at block 880. In response to a short-circuit fault detection, the circuit breaker interrupts the supply of power (e.g., power, current, voltage, etc.) to the branch circuit and load, thereby de-energizing the circuit and connected load, at block 882. At block 882, the circuit breaker can also output a status notification such as Short-Circuit (SC) Fault Alarm or type thereof, e.g., output locally through the user interface (e.g., via the I/O 140) or output to the user/user device or remote monitoring/management computer system).

If a short-circuit fault is not detected at block 880, the circuit breaker can perform overcurrent fault detection and protection for the branch circuit and load by analyzing the monitored energy-related signals, at block 890. In response to a overcurrent fault detection, the circuit breaker interrupts the supply of power (e.g., power, current, voltage, etc.) to the branch circuit and load, thereby de-energizing the circuit and connected load, at block 892, At block 892, the circuit breaker can also output a status notification such as Overcurrent (OC Fault Alarm or type thereof, e.g., output locally through the user interface (e.g., via the I/O 140) or output to the user/user device or remote monitoring/management computer system).

If an overcurrent fault is not detected at block 890, the circuit breaker can store and output (e.g., in real-time) monitored, derived and determined status and diagnostics for the electrical system, circuit breaker, branch circuit and load, at block 898. Such information can be output locally through the user interface (e.g., via the I/O 140) or output to the user/user device or remote monitoring/management computer system) for further analysis or action. The process 850 can thereafter proceed back to block 852 to continue the process.

The process 850 describes examples of different types of faults or conditions (e.g., GF, AF, SCF, OCF, etc.), which can be detected and protected against by the circuit breaker or circuit protective device for the protected branch circuit and load. It should be understood that the circuit breaker or protective devices as described herein can be configured to perform any combination of ground fault detection and protection types in combination with any combination of other fault and/or condition detection and protection as described above. Furthermore, AF detection, OC fault detection and SC fault detection can be performed using conventional detection processes or algorithms, which may, for example, be used in conventional circuit breakers or circuit protection devices.

Figure 9:
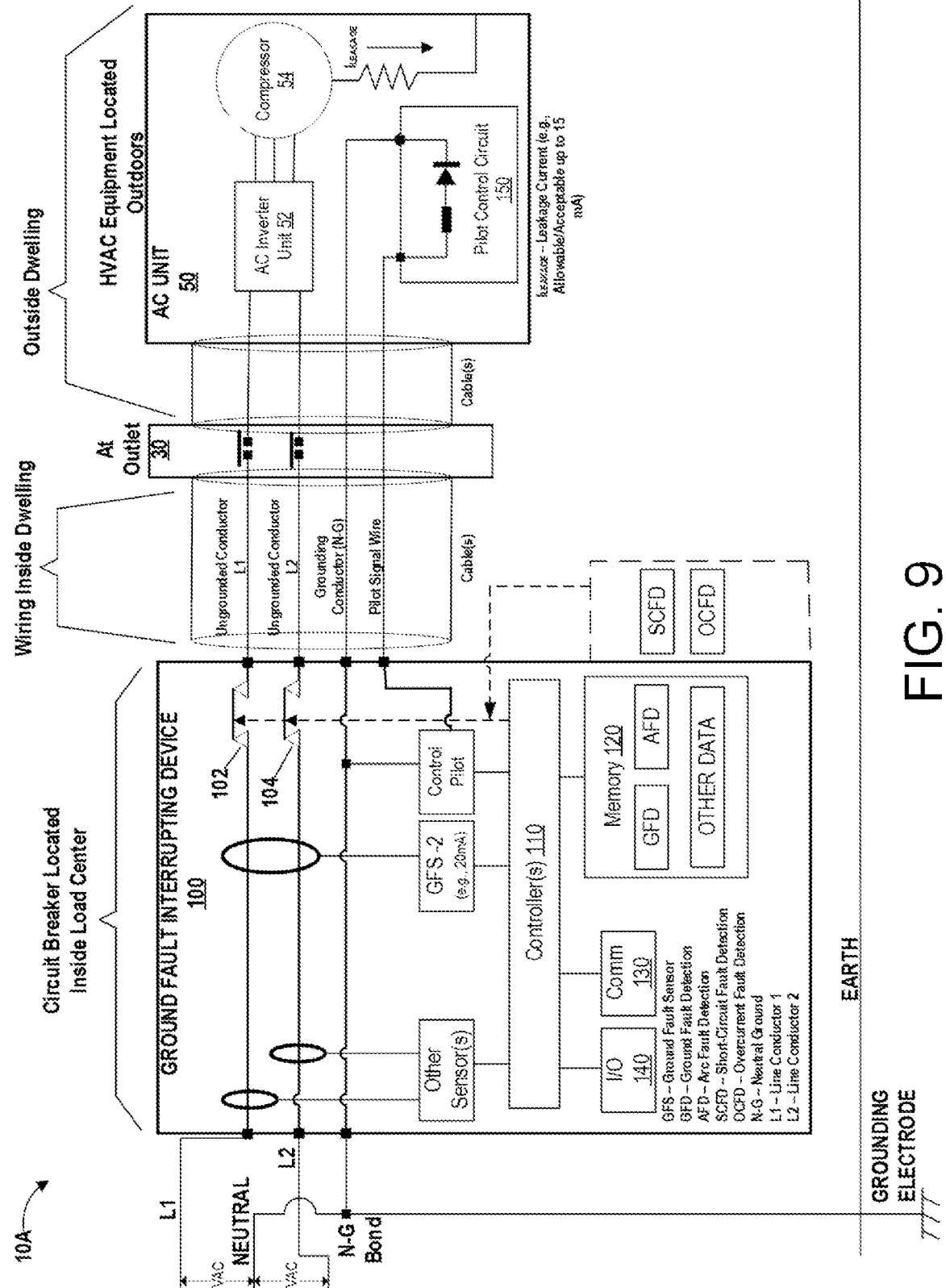
FIG. 9 shows an example of the ground fault detection and protection device (or system) for use with an electrical system with HVAC equipment, in accordance with a second embodiment of the present disclosure.

FIG. 9 shows an example system environment 10A of a ground fault detection and protection system, such as a ground fault interrupting device 100A for use with an electrical system including HVAC (Heating, Ventilation, Air Conditioning) equipment in accordance with a second embodiment of the present disclosure. In FIG. 9, the components and functionality of the device 100A are the same or similar to that in the example device 100 of FIG. 1, except that the device 100A does not include a first ground fault sensor GFS-1. In this second embodiment, the device 100A can detect for a ground fault due to excessive/abnormal leakage current from the load across the grounding conductor using the second ground fault sensor GFS-2, and for a ground fault due to improper connection of the grounding conductor using the pilot or ground monitor (Control Pilot). In various embodiments, the allowable/acceptable range of leakage current for the load can be 15 mA to 20 mA.

Figure 10:
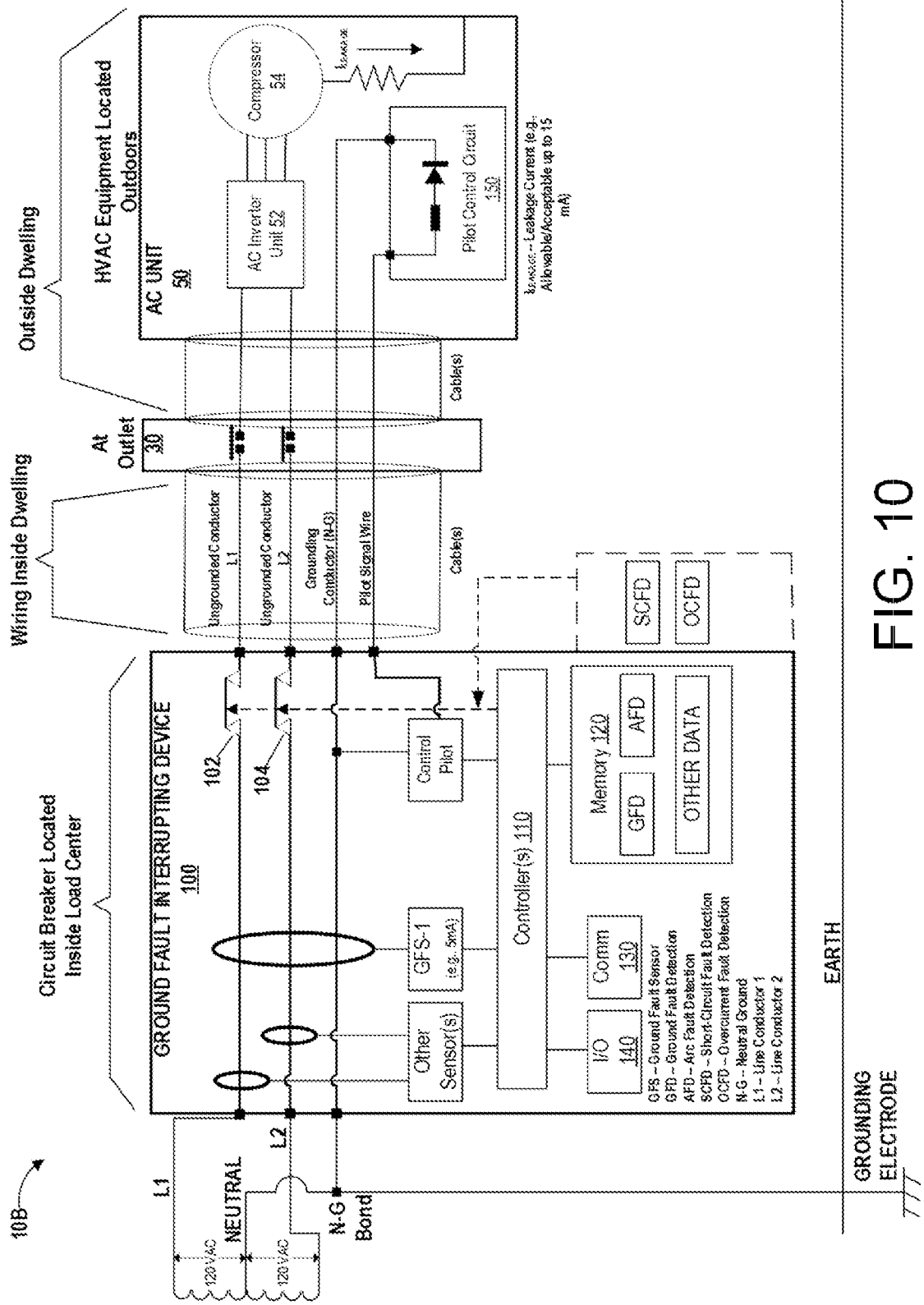
FIG. 10 shows an example of the ground fault detection and protection device (or system) for use with an electrical system with HVAC equipment, in accordance with a third embodiment of the present disclosure.

FIG. 10 shows an example system environment 10B of a ground fault detection and protection system, such as a ground fault interrupting device 100B for use with an electrical system including HVAC (Heating, Ventilation, Air Conditioning) equipment in accordance with a third embodiment of the present disclosure. In FIG. 10, the components and functionality of the device 100B are the same or similar to that in the example device 100 of FIG. 1, except that the device 100B does not include a second ground fault sensor GFS-2. In this third embodiment, the device 100B can detect for a ground fault on the branch circuit or wiring thereof (e.g., ground fault between line conductors L1 or L2 and the Earth ground) using the first ground fault sensor GFS-1, and for an improper connection of the grounding conductor using the pilot or ground monitor (Control Pilot). In various embodiments, the let-go level for the branch circuit can be in the range of 4 mA to 6 mA.

Figure 11:
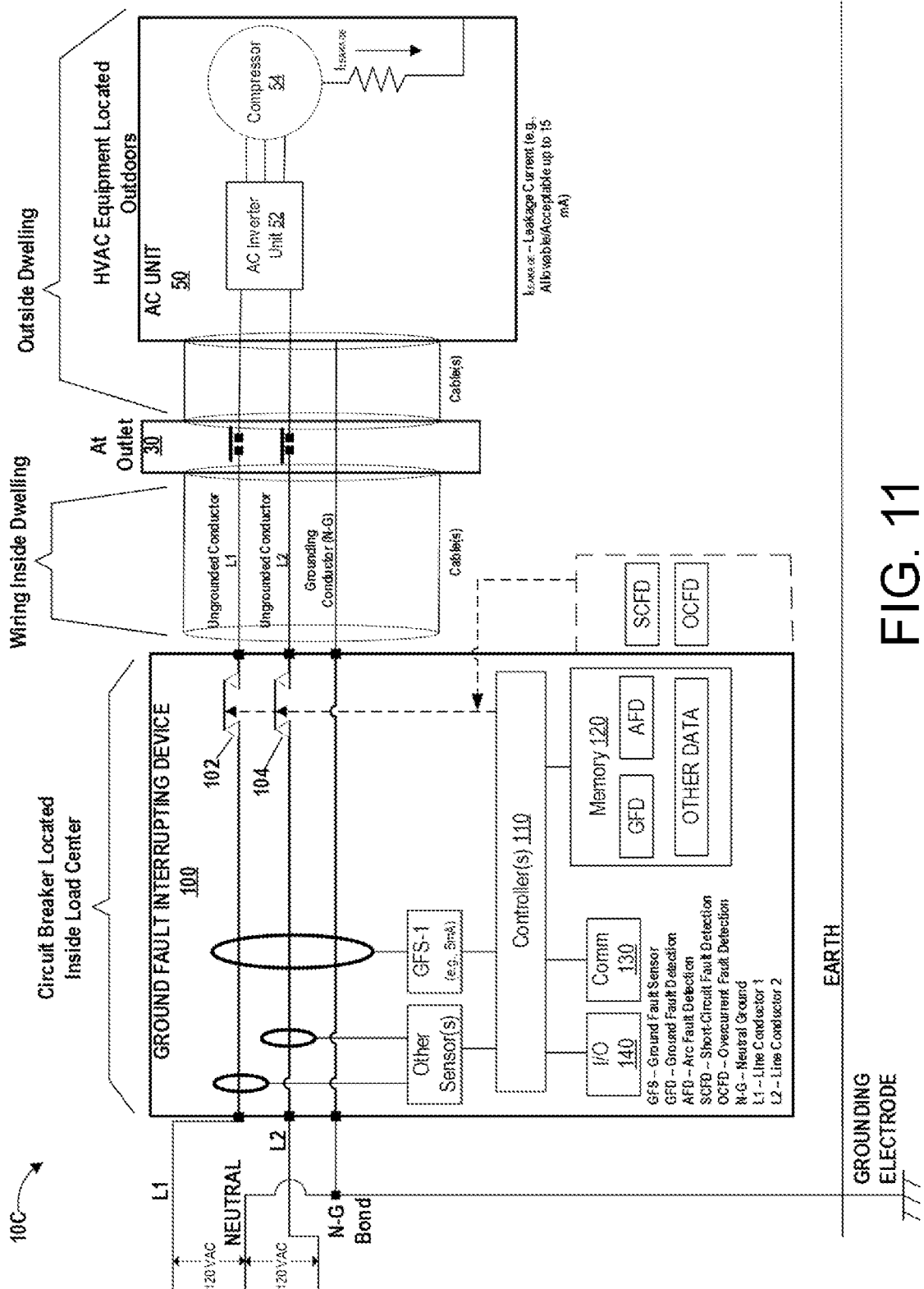
FIG. 11 shows an example of the ground fault detection and protection device (or system) for use with an electrical system with equipment other than HVAC equipment, in accordance with a fourth embodiment of the present disclosure.

FIG. 11 shows an example system environment 10C of a ground fault detection and protection system, such as a ground fault interrupting device 100C for use with an electrical system including HVAC (Heating, Ventilation, Air Conditioning) equipment in accordance with a fourth embodiment of the present disclosure. In FIG. 11, the components and functionality of the device 100C are the same or similar to that in the example device 100 of FIG. 1, except that the device 100C does not include a second ground fault sensor GFS-2 and the pilot or ground monitor. In this fourth embodiment, the device 100B can detect for a ground fault on the branch circuit or wiring thereof (e.g., ground fault between line conductors L1 or L2 and the Earth ground) using the first ground fault sensor GFS-1. In various embodiments, the let-go level for the branch circuit can be in the range of 4 mA to 6 mA.

Figure 12:
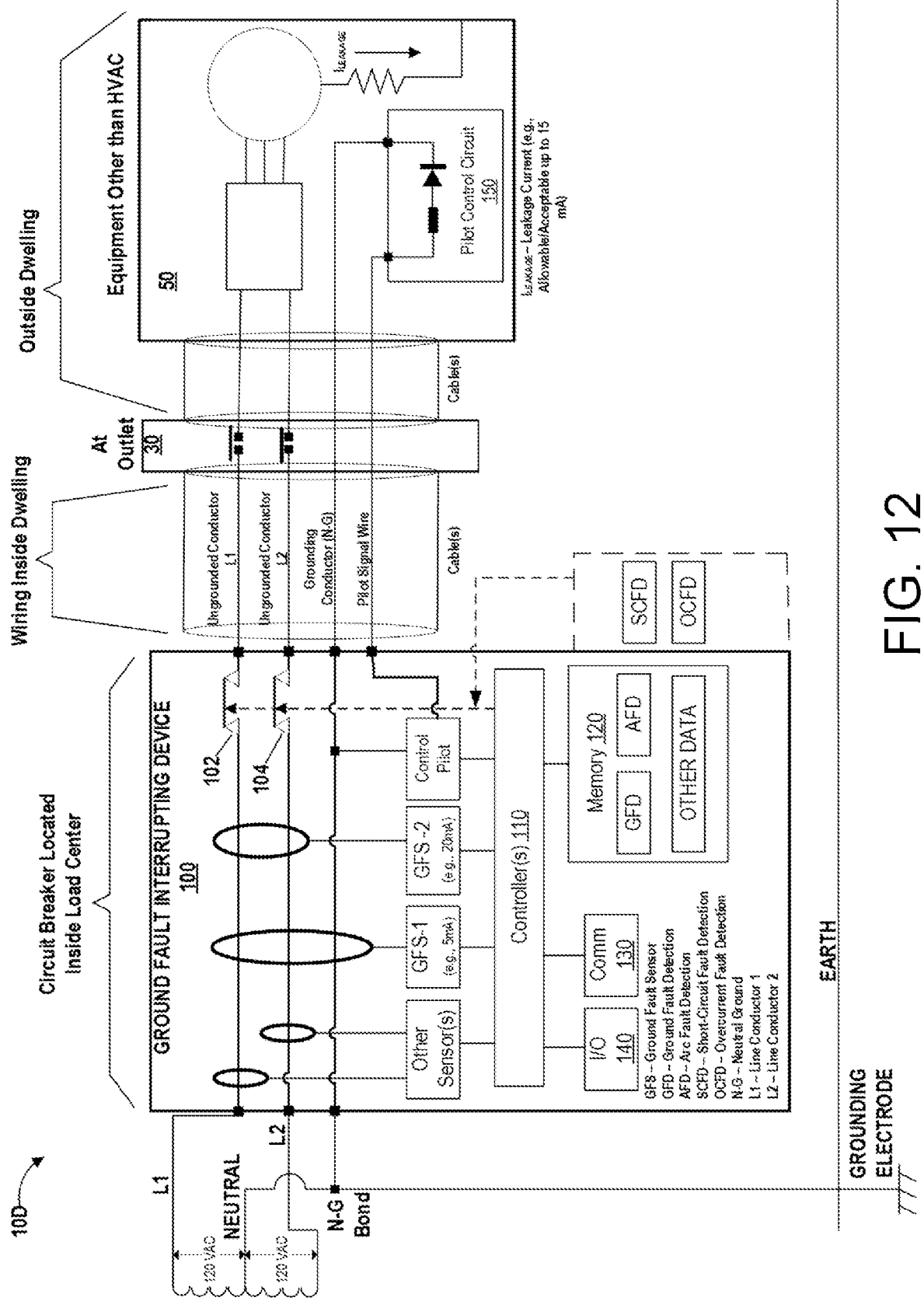
FIG. 12 shows an example of the ground fault detection and protection device (or system) for use with an electrical system with HVAC equipment in accordance with a fifth embodiment of the present disclosure.

FIG. 12 shows an example system environment 10D of a ground fault detection and protection system, such as a ground fault interrupting device 100C for use with an electrical system including electrical equipment other than HVAC equipment in accordance with a fifth embodiment of the present disclosure. In FIG. 12, the components and functionality of the device 100D are the same or similar to that in the example device 100 of FIG. 1, except that the device 100C is used to provide protection to a connected load, which is other than HVAC equipment. In various embodiments, the load or equipment thereof can have an allowable, acceptable or normal leakage current level, which is higher or larger than the let-go current level of the branch circuit.

Figure 13:
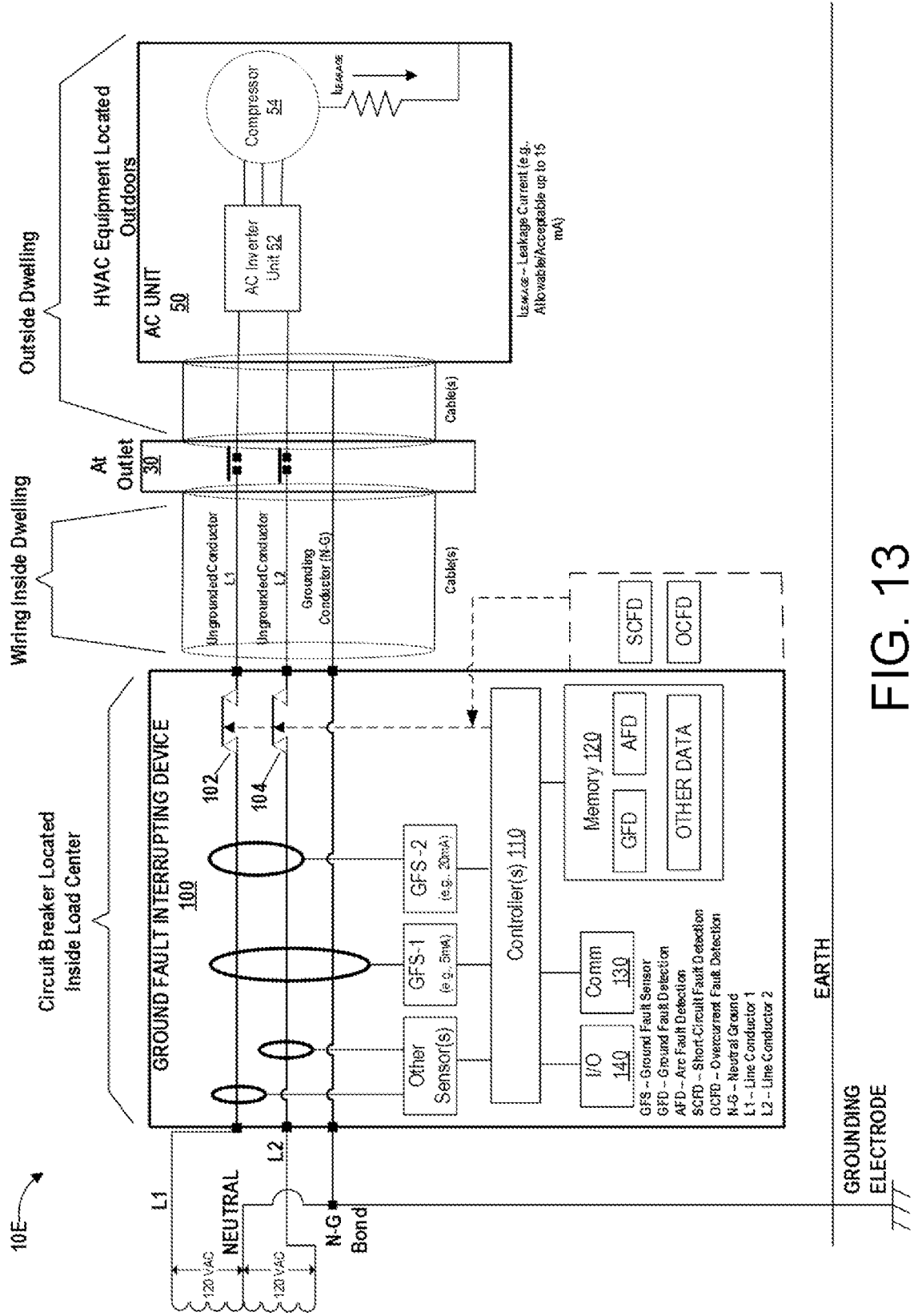
FIG. 13 shows an example of the ground fault detection and protection device (or system) for use with an electrical system with HVAC equipment in accordance with a sixth embodiment of the present disclosure.

FIG. 13 shows an example system environment 10E of a ground fault detection and protection system, such as a ground fault interrupting device 100E for use with an electrical system including HVAC (Heating, Ventilation, Air Conditioning) equipment in accordance with a sixth embodiment of the present disclosure. In FIG. 13, the components and functionality of the device 100E are the same or similar to that in the example device 100 of FIG. 1, except that the device 100E does not include the pilot or ground monitor. In this fourth embodiment, the device 100B can detect for a ground fault on the branch circuit or wiring thereof (e.g., ground fault between line conductors L1 or L2 and the Earth ground) using the first ground fault sensor GFS-1. The device 100E also can detect for a ground fault due to excessive/abnormal leakage current from the load across the grounding conductor using the second ground fault sensor GFS-2. In various embodiments, the let-go level for the branch circuit can be in the range of 4 mA to 6 mA, and the allowable/acceptable range of leakage current for the load can be 15 mA to 20 mA.

FIG. 14 shows a chart 1400 in table form, which provides for the purposes of comparison example configurations, including detection levels or values, for different ground fault detection and protection scenarios. These scenarios include the scenario of a device implementing the current UL 943 Standard for Safety for GFCIs, as well as for the scenarios of the ground fault interrupting device 100, 100A, 100B, 100C, 100D and 100E of the first, second, third, fourth, and fifth embodiments respectively of the present disclosure.

For example, each scenario is shown with an associated configuration for the ground fault interrupting device, such as GF detection level for L1-GC, L2-GC, L1-E, L2-E where GC is the Grounding Conductor, E is Earth Ground, L1 is Ungrounded Conductor Line 1, and L2 is Ungrounded Conductor Line 2. The configuration also can include detection level related to Appliance Metallic Frame to Earth Ground (Appliance Metallic Frame-E), such as whether a Ground Monitor is provided and the Appliance Allowed leakage. As noted in the chart 1400, the appliance metallic frame to earth allowable leakage current to earth can normally equal L1/L2 to allowable leakage current to earth without the ground monitor. With the ground monitor, the leakage current from the metallic frame to earth is close to zero since the ground monitor can make sure the impedance from the frame to earth is very low due to monitoring the grounding conductors and making sure the ground conductor impedance is low.

It should be understood that the various configurations, including values, on the chart 1400 are simply provided as examples.

Figure 15:
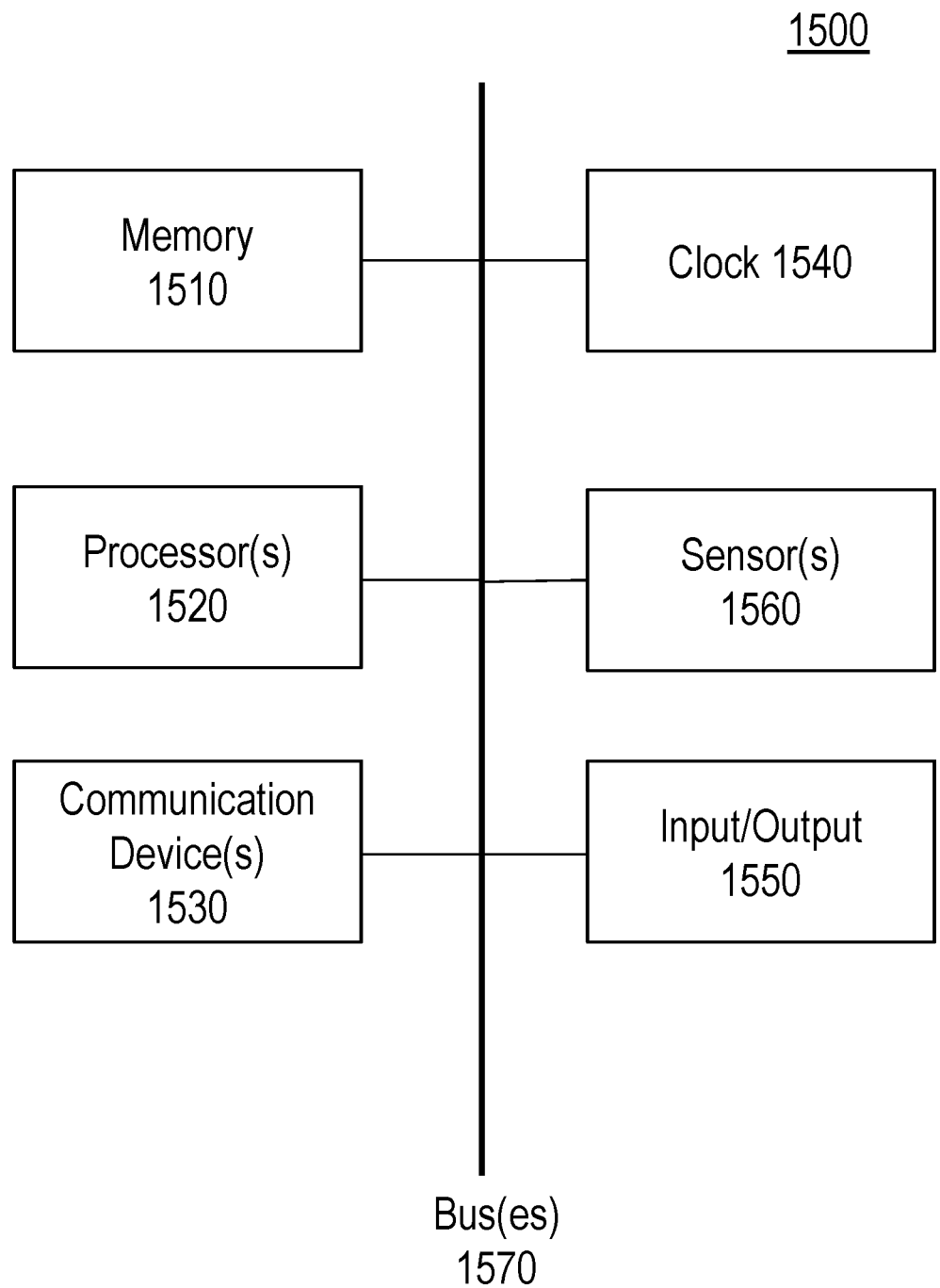
FIG. 15 illustrates example components of a computer device or system, in accordance with embodiments of the present disclosure.

FIG. 15 illustrates example components of a computer device (or system) 1500, in accordance with embodiments of the disclosure. The computer device 1500 can be a controller(s)/processor(s)-implemented fault interrupting device (e.g., ground fault interrupting device, circuit breaker, etc.), local or remote computer device or system (e.g., user device, central monitoring computer system, etc.) or other controller(s)/processor(s)-based device or system as described herein.

The device 1500 can include memory 1510, processor(s) 1520, communication device(s) 1530, clock 1540, input/output device(s) 1550, which can be communicatively connected. In this example, the various components can be communicatively connected via buses 1570. The clock 1540 can be used to time-stamp data or an event with a time value, and to synchronize operations within the device and with remote devices or systems. The communication device(s) 1530 can include transmitters and receivers for conducting wireless communications and/or wireline communications with other remote devices or a network(s).

The memory 1510 can store computer executable code, programs, software, or instructions, which when executed by a processor(s), controls the operations of the device 1500, including the various processes/algorithms described herein. The memory 1510 can also store other data used by the device 1500 or components thereof to perform the operations described herein. The other data can include but is not limited to threshold (or level) values or ranges, diagnostic information, status information, alarm information, and other information as described herein.

The processor(s) 1520, which interacts with the other components of the computer device, is configured to control or implement the various operations and functions described herein, including control of the components of the computer device 1500 and quality analysis of a network installation.

The input/output device(s) 1550 can include one or more input devices, and one or more output devices. The input devices can include a handle, button(s), keyboard, keypad, touch panel or screen, microphone, camera or other known user input devices for use on computer devices or systems, including controller/processor-based circuit protective devices such as fault interrupting devices, miniature circuit breakers and other devices or systems as described herein.

The output devices can include a display screen, speaker, printer, smart output device, LED(s), handle positions, or other known output devices in or for use with computer devices or systems, including controller/processor-based circuit protective devices such as fault interrupting devices, miniature circuit breakers, and other devices or systems as described herein.

The sensor(s) 1560 can include one or more sensors for monitoring energy-related signals on the conductors (e.g., line conductor(s), grounding conductor(s), pilot signal wire, etc.), including those described herein. The sensor(s) 1560 can include current sensor(s), voltage sensor(s), power sensor(s), ground fault sensor(s) for measuring different combination of conductor(s) (e.g., line conductor(s) and/or grounding conductor (including neutral-ground, etc.), etc.), pilot signal sensor or other types of sensors (including those described herein) for sensing energy-related signals to perform diagnostics on an electrical system including its circuit(s) and load(s).

Depending on the application, the computer device 1500 can include or not include various components as shown in the example of FIG. 15, or can include additional components.

It is understood that embodiments of the disclosure herein may be configured as a system, method, or combination thereof. Accordingly, embodiments of the present disclosure may be comprised of various means including hardware, software, firmware or any combination thereof.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and can be given a different name or label. The use of the term "or" is not limited to exclusive "or", but can also mean "and/or".

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware, or any combination thereof.

Any resulting program(s), having computer-readable program code, may be embodied on one or more tangible or non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable or storage medium or in any transmitting medium which transmits such a program.

A processor(s), controller(s) or processing unit(s) as described herein can be a processing system, which can include one or more processors, such as CPU, controllers, ASICs, or other processing units or circuitry, which controls or performs the operations of the devices or systems, described herein. Memory/storage devices can include, but are not limited to, disks, solid state drives, optical disks, removable memory devices such as smart cards, SIMs, WIMs, semiconductor memories such as RAM, ROM, PROMS, etc. Transmitting mediums or networks can include, but are not limited to, transmission via wireline communication, wireless communication (e.g., Radio Frequency (RF) communication, Bluetooth®, Wi-Fi, Li-Fi, etc.), the Internet, intranets, telephone/modem-based network communication, hard-wired/cabled communication network, satellite communication, and other stationary or mobile network systems/communication links.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be appreciated that the concepts, systems, circuits and techniques sought to be protected herein are not limited to use in the example applications described herein (e.g., industrial applications), but rather may be useful in substantially any application where it is desired to receive decision support for each step in an automated fashion. While particular embodiments and applications of the present disclosure have been illustrated and described, it is to be understood that embodiments of the disclosure not limited to the precise construction and compositions disclosed herein and that various modifications, changes, and variations can be apparent from the foregoing descriptions without departing from the spirit and scope of the disclosure as defined in the appended claims.

Having described preferred embodiments, which serve to illustrate various concepts, structures and techniques that are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that the scope of the patent should not be limited to the described embodiments but rather should be limited only by the spirit and scope of the following claims.

What is claimed is:

1. A device for interrupting a supply of power to a branch circuit that supplies power to a load, the circuit including at least a line conductor(s) and a grounding conductor different from the line conductor(s), the device comprising:
   a first ground fault sensor for monitoring an amount of a first leakage current across the line conductor(s) and the grounding conductor, the amount of the first leakage current ignoring leakage current across the grounding conductor;
   a second ground fault sensor for monitoring an amount of a second leakage current of the load from the line conductor(s), the amount of the second leakage current taking into account leakage current across the grounding conductor; and
   a processor(s) configured to:
      detect for a ground fault on the branch circuit based on the amount of the first leakage current monitored by the first ground fault sensor and a first threshold;
      detect for a ground fault at the load due to excessive leakage current based on the amount of the second leakage current, and a second threshold relating to an allowable/acceptable amount of leakage current for the load under normal operation; and
      to control an interruption of the supply of power to the branch circuit if the ground fault on the branch circuit or at the load is detected,
   wherein the processor(s) is further configured to output a report(s) or notification(s) to a remote computer device or system via a communication device or to a local output device, the report(s) or notification(s) being associated with a monitored power, a status and/or diagnostics associated with the supply of power to the branch circuit or load, and
   wherein the report(s) or notification(s) comprises a status notification to perform service or maintenance on the load or equipment associated therewith if the second leakage current is approaching an excessive or abnormal level.

2. The device according to claim 1, wherein the processor(s) is configured to detect a ground fault on the circuit if an amount of the first leakage current exceeds the first threshold based on a let-go current threshold or other physiological condition(s).

3. The device according to claim 2, wherein the processor is configured to detect an excessive leakage current at the load if the second leakage current of the load exceeds the second threshold based on a maximum or upper range of the allowable/acceptable leakage current for the load.

4. The device according to claim 3, wherein the load comprises HVAC equipment, the first threshold is in a first range of approximately 4 mA to approximately 6 mA, and the second threshold is in a second range of approximately 15 mA to approximately 20 mA where the maximum or upper range of the allowable/acceptable leakage current is 15 mA.

5. The device according to claim 1, wherein the load comprises HVAC equipment or other outdoor electrical equipment with the allowable/acceptable leakage current under normal operation being greater than a let-go current level for the branch circuit or a current level based on other physiological condition(s).

6. The device according to claim 1, further comprising a set of electrical contacts across which the power is supplied to the branch circuit, wherein the processor(s) is configured to enable or interrupt the supply of power, via a switch(es) or a trip mechanism, to the branch circuit.

7. The device according to claim 1, wherein the report(s) or notification(s) comprises a status notification to perform service or maintenance on the load or equipment associated therewith if the second leakage current is within a third threshold comprising a predefined current range or value before the second threshold, the third threshold being used to detect for the second leakage current approaching an excessive or abnormal level.

8. The device according to claim 7, wherein the third threshold comprises a third range between approximately 10 mA to approximately 15 mA or a value within the third range.

9. The device according to claim 1, wherein the line conductor(s) comprises at least two line conductors comprising ungrounded conductor(s), grounded conductor(s), or a combination thereof.

10. The device according to claim 1 further comprising:
an arc fault protection subsystem, an overcurrent protection subsystem, and/or a short-circuit sub-system.

11. The device according to claim 1, wherein the device is a miniature circuit breaker or MCB.

12. The device according to claim 11, further comprising:
at least two line-side voltage terminals for plugging onto a load center;
at least two load current carrying conductor terminals for branch circuit wire connections;
at least one service entrance side grounding conductor wire connection; and
at least one branch circuit side grounding conductor wire connection.

13. The device according to claim 1, wherein the first leakage current is a current that flows to Earth.

14. The device according to claim 1, wherein the second leakage current is a current that returns through the grounding conductor.

15. A device for interrupting a supply of power to a branch circuit that supplies power to a load, the circuit including at least a line conductor(s) and a grounding conductor different from the line conductor(s), the device comprising:
a first ground fault sensor for monitoring an amount of a first leakage current across the line conductor(s) and the grounding conductor, the amount of the first leakage current ignoring leakage current across the grounding conductor;
a second ground fault sensor for monitoring an amount of a second leakage current of the load from the line conductor(s), the amount of the second leakage current taking into account leakage current across the grounding conductor; and
a processor(s) configured to:
detect for a ground fault on the branch circuit based on the amount of the first leakage current monitored by the first ground fault sensor;
detect for a ground fault at the load due to excessive leakage current based on the amount of the second leakage current and an allowable/acceptable amount of leakage current for the load under normal operation; and
to control an interruption of the supply of power to the branch circuit if the ground fault on the branch circuit or at the load is detected,
wherein the processor(s) is further configured to:
monitor a pilot signal across a pilot signal wire, which is connected to a pilot control circuit within an enclosure of the load, the control pilot circuit having an electrical component(s) with a predefined load profile that is connected between the pilot signal wire and the grounding conductor;
detect an impedance of a load profile of the control pilot circuit between the pilot signal wire and the grounding conductor using the monitored pilot signal;
detect the grounding conductor being open, broken or improperly connected if the detected impedance of the load profile differs from an acceptable range of impedance for the predefined load profile; and
control an interruption of the supply of power to the branch circuit if the grounding conductor is open, broken or improperly connected.

16. The device according to claim 15, wherein the electrical component(s) of the control pilot circuit comprises a resistor and diode, which are connected in series.

17. The device according to claim 15, further comprising a communication device or a local output device,
wherein the processor(s) is further configured to output a notification to a remote computer device or system via the communication device or to the local output device, the notification indicating that the grounding conductor is open, broken or improperly connected.

18. A method of interrupting a supply of power to a branch circuit that supplies power to a load, the circuit including at least a line conductor(s) and a grounding conductor different from the line conductor(s), the method comprising:
monitoring, via a first ground fault sensor, an amount of a first leakage current across the line conductor(s) and the grounding conductor, the amount of the first leakage current ignoring leakage current across the grounding conductor;
monitoring, via a second ground fault sensor, an amount of a second leakage current of the load across the line conductor(s)), the amount of the second leakage current taking into account leakage current across the grounding conductor;
detecting, via a processor(s), for a ground fault on the branch circuit based on the amount of the first leakage current monitored by the first ground fault sensor and a first threshold;
detecting, via the processor(s), for a ground fault at the load due to excessive leakage current based on the amount of the second leakage current and a second threshold relating to an allowable/acceptable amount of leakage current for the load under normal operation; and
controlling, via the processor(s), an interruption of the supply of power to the branch circuit if the ground fault on the branch circuit or at the load is detected,
wherein the method further comprises:
outputting a report(s) or notification(s) to a remote computer device or system via a communication device or to a local output device, the report(s) or notification(s) being associated with a monitored power, a status and/or diagnostics associated with the supply of power to the branch circuit or load,
wherein the report(s) or notification(s) comprises a status notification to perform service or maintenance on the load or equipment associated therewith if the second leakage current is approaching an excessive or abnormal level.

19. The method according to claim 18, wherein the load has an allowable/acceptable leakage current under normal operation, which is greater than a threshold for ground fault protection of the branch circuit.

20. The method according to claim 18, wherein the load comprises HVAC equipment or other outdoor electrical equipment with the allowable/acceptable leakage current under normal operation being greater than a let-go current level for the branch circuit or a current level based on other physiological condition(s).

21. A device for interrupting a supply of power to a branch circuit that supplies power to a load, the circuit including at least two line conductors and a grounding conductor different from the at least two line conductors, the device comprising:
- at least one ground fault sensor comprising:
  - a first ground fault sensor for monitoring an amount of a first leakage current across the at least two line conductor(s) and the grounding conductor, the amount of the first leakage current ignoring leakage current across the grounding conductor, and/or
  - a second ground fault sensor for monitoring an amount of a second leakage current of the load across the at least two line conductors, the amount of the second leakage current taking into account leakage current across the grounding conductor;
- a processor(s) configured to:
  - detect for at least one type of ground fault, the processor being configured to detect for a ground fault on the branch circuit based on the amount of the first leakage current monitored by the first ground fault sensor, and/or to detect for a ground fault at the load due to excessive leakage current based on the amount of the second leakage current and an allowable/acceptable amount of leakage current for the load under normal operation; and
  - to control an interruption of the supply of power to the branch circuit if the at least one type of ground fault is detected,
- wherein the processor(s) is further configured to:
- monitor a pilot signal across a pilot signal wire, which is connected to a pilot control circuit within an enclosure of the load, the control pilot circuit having an electrical component(s) with a predefined load profile that is connected between the pilot signal wire and the grounding conductor;
- detect an impedance of a load profile of the control pilot circuit between the pilot signal wire and the grounding conductor using the monitored pilot signal;
- detect the grounding conductor being open, broken or improperly connected if the detected impedance of the load profile differs from an acceptable range of impedance for the predefined load profile; and
- control an interruption of the supply of power to the branch circuit if the grounding conductor is open, broken or improperly connected.

22. The device according to claim 21, wherein the at least one ground fault sensor comprises the first and second ground fault sensors,
- the processor(s) being configured to detect for a ground fault on the branch circuit based on the amount of the first leakage current monitored by the first ground fault sensor, and detect for a ground fault at the load due to excessive leakage current based on the amount of the second leakage current and an allowable/acceptable amount of leakage current for the load under normal operation.

23. The device according to claim 21, wherein the load comprises HVAC or other electrical equipment that has an allowable/acceptable leakage current under normal operation, which is greater than a threshold for ground fault protection of the branch circuit.

\* \* \* \* \*